(12) United States Patent
Xu

(10) Patent No.: US 12,063,660 B2
(45) Date of Patent: Aug. 13, 2024

(54) METHOD AND DEVICE FOR ADJUSTING PDCCH MONITORING PERIOD

(71) Applicant: GUANGDONG OPPO MOBILE TELECOMMUNICATIONS CORP., LTD., Dongguan (CN)

(72) Inventor: Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 372 days.

(21) Appl. No.: 17/495,515

(22) Filed: Oct. 6, 2021

(65) Prior Publication Data
US 2022/0030565 A1 Jan. 27, 2022

Related U.S. Application Data

(63) Continuation of application No. PCT/CN2019/090200, filed on Jun. 5, 2019.

(51) Int. Cl.
*H04W 72/04* (2023.01)
*H04W 72/23* (2023.01)

(52) U.S. Cl.
CPC .................. *H04W 72/23* (2023.01)

(58) Field of Classification Search
CPC ... H04W 72/23; H04W 72/27; H04W 5/0053; H04W 5/001
See application file for complete search history.

(56) References Cited

U.S. PATENT DOCUMENTS

| 2013/0329686 A1* | 12/2013 | Kim | H04W 72/04 370/328 |
| 2020/0314678 A1* | 10/2020 | Lee | H04W 72/12 |

(Continued)

FOREIGN PATENT DOCUMENTS

| CN | 108713346 A | | 10/2018 |
| CN | 109417762 | * | 3/2019 |
| CN | 109417762 A | | 3/2019 |

(Continued)

OTHER PUBLICATIONS

Extended European Search Report dated Jun. 7, 2022 received in European Patent Application No. EP 19931863.5.

(Continued)

*Primary Examiner* — Mewale A Ambaye
(74) *Attorney, Agent, or Firm* — Sheppard, Mullin, Richter & Hampton LLP

(57) ABSTRACT

The present disclosure provides a method and a device for adjusting a Physical Downlink Control Channel (PDCCH) monitoring period. The method includes switching, by a terminal device within a plurality of PDCCH search spaces corresponding to a first Bandwidth Part (BWP), a PDCCH search space for monitoring a PDCCH. Different PDCCH search spaces correspond to different PDCCH monitoring periods. On a basis of the above technical solution, the PDCCH monitoring period of the terminal device can better match actual scheduling conditions of a network device. For example, a shorter PDCCH monitoring period can be used in a case of dense scheduling, and a longer PDCCH monitoring period can be used in a case of a long scheduling interval, thereby reducing energy consumption of the terminal device.

17 Claims, 4 Drawing Sheets

300

Switching, by a network device within a plurality of PDCCH search spaces corresponding to a first BWP, a PDCCH search space for transmitting a PDCCH — S310

(56) References Cited

U.S. PATENT DOCUMENTS

| | | | |
|---|---|---|---|
| 2021/0235469 A1 | | 7/2021 | Mu |
| 2022/0225140 A1* | | 7/2022 | Seo .................... H04L 5/00 |

FOREIGN PATENT DOCUMENTS

| | | | |
|---|---|---|---|
| WO | 2017217903 A1 | 12/2017 | |
| WO | 2018127217 A1 | 7/2018 | |
| WO | 2019051707 A1 | 3/2019 | |
| WO | 2019069212 A1 | 4/2019 | |
| WO | 2019091233 A1 | 5/2019 | |
| WO | 2019099880 A1 | 5/2019 | |

OTHER PUBLICATIONS

First Examination Report dated May 25, 2022 received in Indian Patent Application No. IN 202127061642. Translation included.

Communication pursuant to Article 94(3) EPC for European application 19931863.5 mailed Mar. 1, 2023.

First Office Action from corresponding Chinese Application No. 202210074414.3, dated Mar. 10, 2023 . English translation attached.

International Search Report and Written Opinion date Mar. 12, 2020 in International Application No. PCT/CN2019/090200. English translation attached.

CMCC,. "3GPP TSG RAN WG1 #96, R1-1903344," Discussion on UE power saving schemes with adaption to UE traffic, Feb. 25, 2019, Part 1-4, 14 pages.

Vivo,. "3GPP TSG RANWG1 #97, R1-1906172," Discussion on PDCCH monitoring skipping and PDCCH monitoring periodicity switch, May 13, 2019, Part 2.2, 4 pages.

CATT, CAICT "New WID: UE Power Saving in NR", 3GPP TSG RAN Meetings #84, RP-191607, Jun. 3-6, 2019 (update_v4_change_mark), 5 pages.

CATT, CAICT "New WID: UE Power Saving in NR", 3GPP TSG RAN Meetings #84, RP-191607, Jun. 3-6, 2019 (update_v4_clean), 5 pages.

RP-191607_Time budget request_NR Power Saving (2019) 3 pages.

Grant Notice & Supplementary Search from corresponding Chinese Application No. 202210074414.3, dated Jun. 15, 2023 . English translation attached.

Vivo, "Remaining issues on PDCCH search space"3GPP TSG RAN WG1 Meeting #92bis , 3GPP tsg_ran\WG1_RL1, R1-1803828,Apr. 6, 2018, full text, 6 pages.

"3rd Generation Partnership Project; Technical Specification Group Radio Access Network; NR;Physical layer procedures for control(Release 15)" 3GPP TS 38.213 V15.5.0 (Mar. 2019), full text, 104 pages.

Hearing Notice dated Jan. 15, 2024 received in Indian Patent Application No. IN202127061642.

* cited by examiner

200

Switching, by a terminal device within a plurality of PDCCH search spaces corresponding to a first BWP, a PDCCH search space for monitoring a PDCCH ⸺S210

300

Switching, by a network device within a plurality of PDCCH search spaces corresponding to a first BWP, a PDCCH search space for transmitting a PDCCH — S310

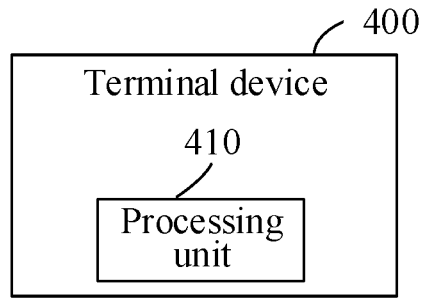
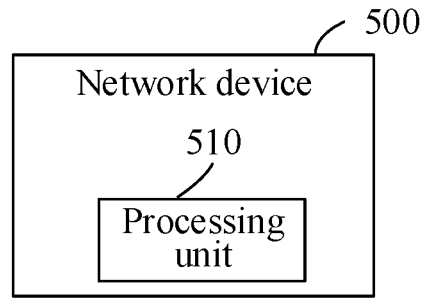
FIG. 7  FIG. 8
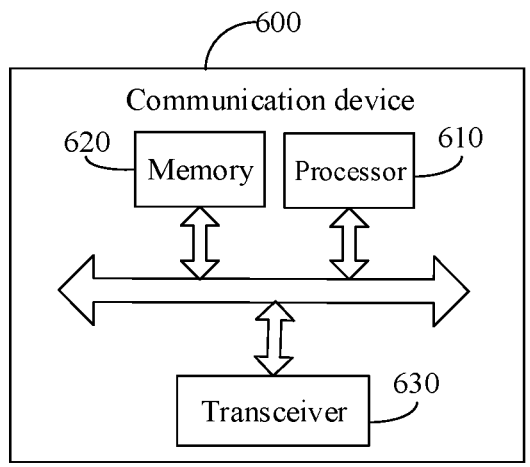
FIG. 9
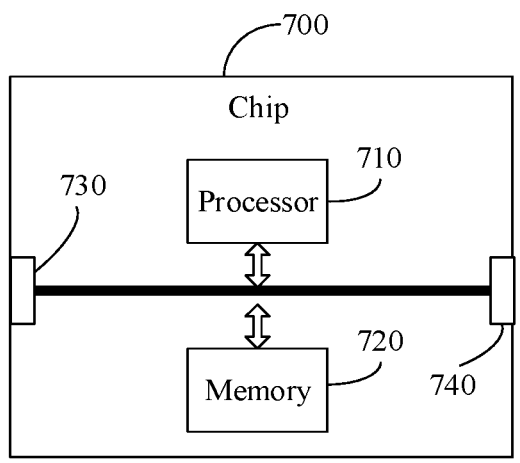
FIG. 10

METHOD AND DEVICE FOR ADJUSTING PDCCH MONITORING PERIOD

CROSS-REFERENCE TO RELATED APPLICATIONS

The present application is a continuation of International Application No. PCT/CN2019/090200 filed on Jun. 5, 2019, which is hereby incorporated by reference in its entirety.

TECHNICAL FIELD

An embodiment of the present disclosure relates to the field of communication, and more particularly, to a method and a device for adjusting a Physical Downlink Control Channel (PDCCH) monitoring period.

BACKGROUND

In the existing PDCCH configuration, a PDCCH search space is semi-statically configured by Radio Resource Control (RRC).

Due to the diversity and constant changes of terminal services, the semi-statically configured PDCCH search space cannot well match changing service characteristics and scheduling intervals. For example, a PDCCH monitoring period corresponding to a PDCCH search space configured by a network device for a terminal device is relatively short, and it is assumed that the terminal device currently initiates a downlink service with a long packet transmission interval. Since the terminal device needs to consume power for monitoring the PDCCH, from the perspective of power saving of the terminal device, the terminal device prefers to use a PDCCH search space corresponding to a longer PDCCH monitoring period, without affecting a service transmission delay.

Therefore, there is an urgent need in the related art for a method and a device that can reduce the power consumption of the terminal device.

SUMMARY

The present disclosure provides a method and a device for adjusting a PDCCH monitoring period, capable of better matching the PDCCH monitoring period of a terminal device with actual scheduling conditions of a network device. For example, a shorter PDCCH monitoring period can be used in a case of dense scheduling, and a longer PDCCH monitoring period can be used in a case of a long scheduling interval, thereby reducing energy consumption of the terminal device.

In a first aspect, a method for adjusting a PDCCH monitoring period is provided. The method includes switching, by a terminal device within a plurality of PDCCH search spaces corresponding to a first Bandwidth Part (BWP), a PDCCH search space for monitoring a PDCCH. Different PDCCH search spaces correspond to different PDCCH monitoring periods.

In a second aspect, a method for adjusting a PDCCH monitoring period is provided. The method includes switching, by a network device within a plurality of PDCCH search spaces corresponding to a first BWP, a PDCCH search space for transmitting a PDCCH. Different PDCCH search spaces correspond to different PDCCH monitoring periods.

In a third aspect, a terminal device is provided. The terminal device is configured to perform the method in the above first aspect or each implementation of the first aspect. Specifically, the terminal device includes a functional module configured to perform the method in the first aspect or each implementation of the first aspect.

In a fourth aspect, a network device is provided. The network device is configured to perform the method in the second aspect or each implementation of the second aspect. Specifically, the network device includes a functional module configured to perform the method in the second aspect or each implementation of the second aspect.

In a fifth aspect, a terminal device is provided. The terminal device includes a processor. The processor is configured to invoke and run a computer program stored in a memory to perform the method in the first aspect or each implementation of the first aspect.

In a sixth aspect, a network device is provided. The network device includes a processor. The processor is configured to invoke and run a computer program stored in a memory to perform the method in the second aspect or each implementation of the second aspect.

In a seventh aspect, a chip is provided. The chip is configured to perform the method in any aspect of the first aspect to the second aspect or each implementation of any aspect of the first aspect to the second aspect. Specifically, the chip includes a processor. The processor is configured to invoke and run a computer program from a memory, whereby a device provided with the chip is operative to perform the method in any aspect of the first aspect to the second aspect or each implementation of any aspect of the first aspect to the second aspect.

In an eighth aspect, a computer-readable storage medium is provided. The computer-readable storage medium is configured to store a computer program. The computer program causes a computer to perform the method in any aspect of the first aspect to the second aspect or each implementation of any aspect of the first aspect to the second aspect.

In a ninth aspect, a computer program product is provided. The computer program product includes computer program instructions. The computer program instructions cause a computer to perform the method in any aspect of the first aspect to the second aspect or each implementation of any aspect of the first aspect to the second aspect.

In a tenth aspect, a computer program is provided. The computer program, when running on a computer, causes the computer to perform the method in any aspect of the first aspect to the second aspect or each implementation of any aspect of the first aspect to the second aspect.

On a basis of the above technical solutions, a PDCCH monitoring period of the terminal device can better match actual scheduling conditions of a network device. For example, a shorter PDCCH monitoring period can be used in a case of dense scheduling, and a longer PDCCH monitoring period can be used in a case of a long scheduling interval, thereby reducing energy consumption of the terminal device.

BRIEF DESCRIPTION OF DRAWINGS

FIG. 7 is a schematic block diagram of a terminal device according to an embodiment of the present disclosure.

FIG. 8 is a schematic block diagram of a network device according to an embodiment of the present disclosure.

FIG. 9 is a schematic block diagram of a communication device according to an embodiment of the present disclosure.

FIG. 10 is a schematic block diagram of a chip according to an embodiment of the present disclosure.

DESCRIPTION OF EMBODIMENTS

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

Figures 1, 2:
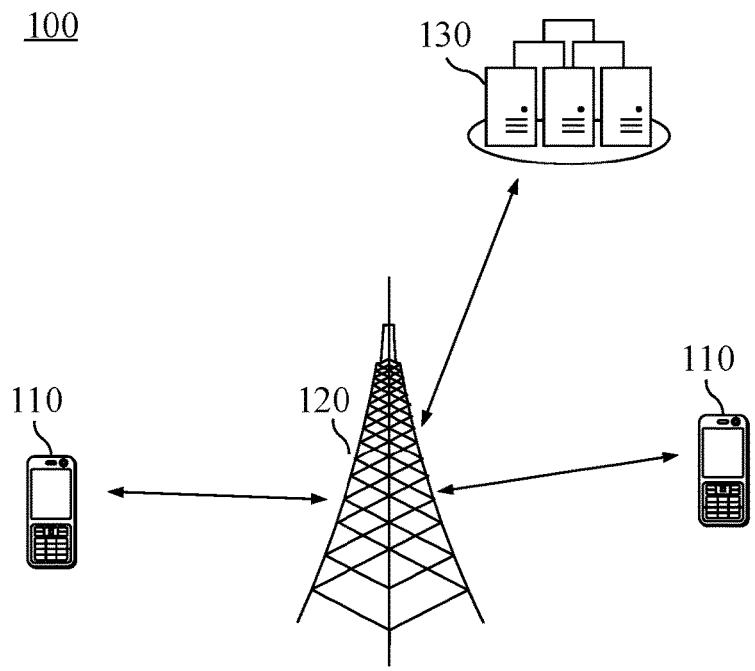
FIG. 1 is an example of an application scenario of the present disclosure.
FIG. 2 to FIG. 5 are schematic flowcharts illustrating a method for switching a PDCCH search space for monitoring a PDCCH according to an embodiment of the present disclosure.

FIG. 1 is a schematic diagram of an application scenario according to an embodiment of the present disclosure.

As illustrated in FIG. 1, a communication system 100 may include a terminal device 110 and a network device 120. The network device 120 may communicate with the terminal device 110 via a radio interface. The terminal device 110 and the network device 120 support multi-service transmission therebetween.

It should be understood that the embodiments of the present disclosure only use the communication system 100 for exemplary description, and the embodiments of the present disclosure are not limited thereto. That is, the technical solutions according to the embodiments of the present disclosure can be applied to various communication systems, such as a Long Term Evolution (LTE) system, an LTE Time Division Duplex (TDD) system, a Universal Mobile Telecommunication System (UMTS), a 5$^{th}$ Generation (5G) communication system (also referred to as a New Radio (NR) communication system), or a future communication system, etc.

In the communication system 100 illustrated in FIG. 1, the network device 120 can be an access network device that communicates with the terminal device 110. The access network device may provide communication coverage for a specific geographic area, and may communicate with the terminal device 110 (for example, a User Equipment (UE)) located in the coverage area.

Optionally, the network device 120 may be an evolutional base station such as an Evolutional Node B (eNB or eNodeB) in an LTE system, a Next Generation Radio Access Network (NG RAN) device, a base station such as a next Generation Node B (gNB) in an NR system, or a wireless controller in a Cloud Radio Access Network (CRAN). Alternatively, the network device 120 can be a relay station, an access point, a vehicle-mounted device, a wearable device, a hub, a switch, a bridge, a router, or a network device in a future evolved Public Land Mobile Network (PLMN), etc.

Optionally, the terminal device 110 can be any terminal device, including but not limited to a terminal device connected to the network device 120 or another terminal device in a wired or wireless manner. The terminal device can refer to an access terminal, a UE, a user unit, a user station, a mobile station, a mobile platform, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, a terminal device in a 5G network, or a terminal device in a future evolved network, etc.

Optionally, Device-to-Device (D2D) communication may be performed between the terminal devices 110.

A wireless communication system 100 may further include a core network device 130 that communicates with a base station. The core network device 130 may be a 5G Core (5GC) device, e.g., an Access and Mobility Management Function (AMF), an Authentication Server Function (AUSF), a User Plane Function (UPF), and a Session Management Function (SMF). Optionally, the core network device 130 may alternatively be an Evolved Packet Core (EPC) device of an LTE network, e.g., a Session Management Function+Core Packet Gateway (SMF+PGW-C) device. It should be understood that the SMF+PGW-C can simultaneously realize functions that the SMF and the PGW-C can realize. In a process of network evolution, the above core network device may also be called by other names, or a new network entity may be formed by dividing functions of the core network, and this embodiment of the present disclosure is not limited to any of these examples.

In a specific example, functional units in the communication system 100 may establish a connection with each other through a Next Generation (NG) network interface to implement communication.

For example, the terminal device can establish a radio interface connection with the access network device through an NR interface to transmit user plane data and control plane signaling. The terminal device can establish a control plane signaling connection with the AMF through an NG interface 1 (abbreviated as N1). The access network device, e.g., a next generation wireless access base station such as the gNB, can establish a user plane data connection with the UPF through an NG interface 3 (abbreviated as N3). The access network device can establish the control plane signaling connection with the AMF through an NG interface 2 (abbreviated as N2). The UPF can establish the control plane signaling connection with the SMF through an NG interface 4 (abbreviated as N4). The UPF can exchange user plane data with a data network via an NG interface 6 (abbreviated as N6). The AMF can establish the control plane signaling connection with the SMF via an NG interface 11 (abbreviated as N11). The SMF can establish the control plane signaling connection with the PCF through an NG interface 7 (abbreviated as N7). It should be noted that FIG. 2 is only an exemplary architecture diagram. In addition to functional units illustrated in FIG. 1, the network architecture may further include other functional units or functional entities. For example, the core network device may further include other functional units such as Unified Data Management (UDM), and this embodiment of the present disclosure is not limited to any of these examples.

FIG. 1 exemplarily illustrates one base station, one core network device and two terminal devices. Optionally, the wireless communication system 100 may include a plurality of base station devices, and another number of terminal devices may be included in coverage of each base station. The embodiment of the present disclosure is not limited in this regard.

It should be understood that, in the embodiments of the present disclosure, a device having a communication function in a network/system may be referred to as a communication device. Taking the communication system 100 illustrated in FIG. 1 as an example, communication devices may include the network device 120 and the terminal devices 110, each having a communication function. The network device 120 and the terminal device 110 may be any of specific devices described above, and details thereof will be omitted here. The communication device may further include another device in the communication system 100, for example other network entities such as a network controller, a mobility management entity, etc., and the embodiments of the present disclosure are not limited to any of these examples.

It should be understood that terms "system" and "network" in the present disclosure are often used interchangeably herein. The term "and/or" in the present disclosure only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

In some embodiments of the present disclosure, the communication system 100 may be 5G NR. The 5G NR can further increase a system bandwidth on a basis of $4^{th}$ Generation (4G) to provide a greater data transmission rate, thereby improving user experience. For example, in the 5G NR, for frequency bands below 6 GHz, a maximum bandwidth supported by a single carrier can be 100 MHz; and for frequency bands above 6 GHz, the maximum bandwidth supported by a single carrier can be 400 MHz.

Like the LTE system, the 5G NR can also support Carrier Aggregation (CA) technology. For example, the network device may configure a plurality of serving cells for the terminal device, and the terminal device may simultaneously transmit and receive data on the plurality of serving cells, thereby increasing the data transmission rate.

On the other hand, for a large carrier bandwidth, such as 100 HMz, a bandwidth that terminal device needs to use is often very limited. If the terminal device keeps performing detection and measurement on the entire bandwidth, a great challenge can be brought to power consumption of the terminal, which is not conducive to power saving of the terminal device. Therefore, the terminal device can transmit and receive data on a continuous bandwidth (i.e., BWP) which is a part of a carrier of the entire large bandwidth. That is, the terminal device only needs to perform related operations within this bandwidth part configured by the network device, thereby reducing the power consumption of the terminal device.

For each serving cell of the terminal device, the network device can configure one or more BWPs for the terminal device on the serving cell through RRC configuration information. For example, a configurable maximum number of BWPs can be four. At each moment, the terminal device may only have one activated Downlink (DL) BWP and one activated Uplink (UL) BWP on this serving cell. That is, the terminal device can only transmit and receive data on the activated BWP.

Further, the following four ways can be used to implement BWP switching:
1. BWP switching based on a PDCCH.
2. BWP switching based on RRC (re)configuration.
3. BWP switching based on a timer timeout.
4. BWP switching caused by random access initialization.

The terminal device obtains downlink or uplink scheduling information by receiving a PDCCH transmitted by the network device, thereby further completing reception and transmission of service data. Since time when the network device schedules the terminal device is not fixed, and there is no related signaling to inform the terminal device whether the network device transmits a PDCCH to the terminal device, the terminal device needs to blindly detect the PDCCH.

In order to reduce the complexity of blind detection of the terminal, it is necessary to limit a set of PDCCHs to be detected blindly. Therefore, a concept of a PDCCH search space, i.e., a set of PDCCH resources to be blindly detected by the terminal, may be introduced. The network device can configure one or more PDCCH search spaces for each BWP of the terminal device through semi-static configuration information. Each PDCCH search space may correspond to one PDCCH monitoring period.

For example, at least one PDCCH search space can be configured for the currently activated BWP of the terminal device through semi-static configuration information. When each PDCCH search space corresponds to one PDCCH monitoring period, each of the at least one PDCCH search space may be in an activated state. That is, the terminal device may transmit and receive data on the at least one PDCCH search space.

However, when the at least one PDCCH search space includes a plurality of PDCCH search spaces, and each of the plurality of PDCCH search spaces is in the activated state, due to the diversity and constant changes of terminal services, activating the plurality of PDCCH search spaces simultaneously cannot well match changing service characteristics and scheduling intervals. For example, a PDCCH monitoring period corresponding to a PDCCH search space configured by the network device for the terminal device is relatively short, and it is assumed that the terminal device currently initiates a downlink service with a long packet transmission interval. Since the terminal device needs to consume power to monitor the PDCCH, without affecting a service transmission delay, the terminal device may prefer to use a PDCCH search space corresponding to a long PDCCH monitoring period from a perspective of power saving of the terminal device.

The present disclosure provides a method for adjusting a PDCCH monitoring period, such that the PDCCH monitoring period of the terminal device can better match actual scheduling conditions of the network device. For example, a shorter PDCCH monitoring period can be used in a case of dense scheduling, and a longer PDCCH monitoring period can be used in a case of a long scheduling interval, thereby reducing energy consumption of the terminal device.

FIG. 2 illustrates a method for adjusting a PDCCH monitoring period according to an embodiment of the present disclosure.

Referring to FIG. 2, a method 200 may include the following steps.

At S210, a terminal device switches, within a plurality of PDCCH search spaces corresponding to a first BWP, a PDCCH search space for monitoring a PDCCH. Here, Different PDCCH search spaces correspond to different PDCCH monitoring periods.

Here, the first BWP may be a currently activated BWP in a currently activated serving cell of the terminal device. The PDCCH search spaces corresponding to the first BWP may include a PDCCH search space in an activated state and a PDCCH search space in a deactivated state. The PDCCH search space in the activated state may be switched to the deactivated state, and the PDCCH search space in the deactivated state may be switched to the activated state.

For example, the network device can dynamically adjust the PDCCH search space that the terminal device needs to use based on actual scheduling conditions. Since different PDCCH search spaces are configured with different PDCCH monitoring periods, adjusting the PDCCH search space can adjust the PDCCH monitoring period corresponding to the PDCCH search space, such that the PDCCH monitoring period of the terminal device can better match actual scheduling conditions of the network device. For example, a shorter PDCCH monitoring period can be used in a case of dense scheduling, and a longer PDCCH monitoring period can be used in a case of a long scheduling interval, thereby reducing energy consumption of the terminal device.

Optionally, the plurality of PDCCH search spaces corresponding to the first BWP may be configured to the terminal device through configuration information.

For example, the terminal device may receive the configuration information. The configuration information may include at least one of:
- at least one serving cell;
- at least one BWP corresponding to each serving cell;
- at least one PDCCH search space corresponding to each BWP;
- a PDCCH monitoring period corresponding to each PDCCH search space;
- discontinuous reception (DRX); and
- a Wake-up Signal (WUS).

At least one PDCCH search space can be configured for each BWP through the RRC configuration information. Different PDCCH search spaces may correspond to different PDCCH monitoring periods. At each moment, only one PDCCH search space may be activated. The terminal device may only monitor the PDCCH at a time-frequency resource position corresponding to this activated PDCCH search space.

Embodiment 1

Since a PDCCH search space corresponding to each BWP may include a PDCCH search space in the deactivated state, after the terminal device switches a BWP for receiving data, an initially activated PDCCH search space needs to be determined in at least one PDCCH search space corresponding to a switched BWP.

For example, the terminal device may switch the BWP for receiving data from the first BWP to a second BWP. The terminal device may determine an initially activated PDCCH search space in at least one PDCCH search space corresponding to the second BWP. The terminal device may monitor the PDCCH in the initially activated PDCCH search space.

Further, the terminal device may receive first indication information. The first indication information may indicate the initially activated PDCCH search space. That is, after switching from the first BWP to the second BWP, the terminal device needs to determine the PDCCH search space indicated by the first indication information as the initially activated PDCCH search space.

It should be understood that the present disclosure does not limit a specific form of the first indication information.

Optionally, the first indication information may be pre-configured information. For example, the terminal device may receive the RRC configuration information which may include the first indication information. Optionally, the first indication information may alternatively be information dynamically indicated by the network device. For example, the terminal device may receive a PDCCH carrying second indication information. The second indication information may be used to instruct the terminal device to switch the BWP for receiving data. The PDCCH carrying the second indication information may include the first indication information. Optionally, the first indication information may alternatively be pre-configured information. That is, a default initially activated PDCCH search space may be specified in the at least one PDCCH search space corresponding to each BWP. For example, the default initially activated PDCCH search space can be specified in a communication protocol.

Assuming that the terminal device switches to a second DL BWP, the terminal device may preferentially determine, based on the information which is dynamically indicated, an initially activated PDCCH search space of the second DL BWP.

If the terminal device receives signaling for indicating a PDCCH search space to be used by the terminal device as the initially activated PDCCH search space on the second DL BWP, e.g., the PDCCH indicating the second DL BWP received by the terminal device may also carry indication information for indicating the initially activated PDCCH search space, the terminal device may determine the initially activated PDCCH search space indicated in the received signaling as the PDCCH search space that needs to be activated after the terminal device switches to the second DL BWP.

If the terminal device receives no signaling for indicating a PDCCH search space to be used by the terminal device as the initially activated PDCCH search space on the second DL BWP, the terminal device may determine the initially activated PDCCH search space configured for the second DL BWP in the RRC configuration information as the PDCCH search space that needs to be activated after the terminal device switches to the second DL BWP.

In some embodiments of the present disclosure, the network device may dynamically instruct the terminal device to switch the PDCCH search space for monitoring the PDCCH.

For example, the terminal device may receive third indication information. Specifically, the third indication information may indicate a target PDCCH search space. The terminal device may switch the PDCCH search space for monitoring the PDCCH to the target PDCCH search space. That is, after receiving the third indication information, the terminal device may switch the PDCCH search space for monitoring the PDCCH to the target PDCCH search space indicated by the third indication information.

It should be understood that the embodiments of the present disclosure do not limit a specific form of the third indication information.

For example, the third indication information may be carried in a WUS, a Medium Access Control Control Element (MAC CE), or the PDCCH.

In some other embodiments of the present disclosure, the terminal device switches, based on a position of a first PDCCH search space that is activated and corresponds to the first BWP in a PDCCH search space queue, the PDCCH search space for monitoring the PDCCH. The PDCCH search space queue is formed by sorting all PDCCH search spaces corresponding to the first BWP in an ascending order based on the PDCCH monitoring periods.

For example, when the first PDCCH search space is not a last PDCCH search space in the PDCCH search space queue, the terminal device switches to a PDCCH search space following the first PDCCH search space in the PDCCH search space queue.

For another example, when the first PDCCH search space is neither the last but one PDCCH search space nor the last PDCCH search space in the PDCCH search space queue, the terminal device switches the PDCCH search space for monitoring the PDCCH to a PDCCH search space following a PDCCH search space of a PDCCH search space following the first PDCCH search space.

Optionally, prior to switching, based on the position of the first PDCCH search space in the PDCCH search space queue, the PDCCH search space for monitoring the PDCCH, the terminal device may determine, based on the position of the first PDCCH search space in the PDCCH search space queue, whether to switch the PDCCH search space for monitoring the PDCCH. Further, when determining to switch the PDCCH search space for monitoring the PDCCH, the terminal device switches the PDCCH search space for monitoring the PDCCH. When determining not to switch the PDCCH search space for monitoring the PDCCH, the terminal device may maintain the currently activated PDCCH search space as the PDCCH search space for monitoring the PDCCH.

For example, when the first PDCCH search space is the last PDCCH search space in the PDCCH search space queue, the terminal device may maintain the first PDCCH search space as the activated PDCCH search space. That is, the terminal device does not switch the PDCCH search space for monitoring the PDCCH.

In some embodiments of the present disclosure, the terminal device may further be configured with a first timer. In this case, the PDCCH search space for monitoring the PDCCH may be switched in combination with the first timer and the PDCCH search space queue.

For example, the terminal device may switch, after an expiry of the first timer, the PDCCH search space for monitoring the PDCCH based on the position of the first PDCCH search space in the PDCCH search space queue. A time length of the first timer is a maximum time length during which the terminal device is allowed to receive no PDCCH in the first PDCCH search space.

That is, after the expiry of the first timer, the terminal device is triggered to switch the PDCCH search space for monitoring the PDCCH based on the position of the first PDCCH search space in the PDCCH search space queue.

The terminal device may start or restart, in response to receiving the PDCCH in the first PDCCH search space, the first timer; and/or, the terminal device may start or restart, in response to completing switching of the PDCCH search space, the first timer.

Optionally, the first timer may be configured to the terminal device through the configuration information.

It should be understood that the present disclosure does not limit the specific configuration of the first timer.

For example, one first timer may be configured for each serving cell of the terminal device, or one first timer may be configured for each BWP, or even one first timer may be configured for each PDCCH search space.

The method for the terminal device to switch the PDCCH search space will be described below from the perspective of the first timer.

Optionally, the method for the terminal device to switch the PDCCH search space may include part or all of the following steps.

At step 1, the terminal device may sort all PDCCH search spaces corresponding to the currently activated DL BWP in an ascending order based on PDCCH monitoring periods corresponding to the all PDCCH search spaces, to form the PDCCH search space queue.

At step 2, the terminal device may start or restart a Search Space Inactivity Timer (SSInactivityTimer) at a moment when switching to a certain PDCCH search space.

At step 3, the terminal device may restart the SSInactivityTimer after receiving the PDCCH at a time-frequency position corresponding to the currently activated PDCCH search space.

At step 4, after an expiry of the SSInactivityTimer, the terminal device may determine, based on the position of the currently activated PDCCH search space in the PDCCH search space queue determined in step 1, whether to switch the PDCCH search space for monitoring the PDCCH.

For example, if the currently activated PDCCH search space is not the last PDCCH search space in the PDCCH search space queue determined at step 1 (i.e., not the PDCCH search space with the longest PDCCH monitoring period in all PDCCH search spaces configured on the currently activated DL BWP), the terminal device may automatically switch to a PDCCH search space following the currently activated PDCCH search space in the PDCCH search space queue determined at step 1. Otherwise, the terminal device does not perform switching of the PDCCH search space.

In some embodiments of the present disclosure, the terminal device may be further configured with a counter for triggering the terminal device to switch the PDCCH search space for monitoring the PDCCH.

For example, the terminal device switches, after the counter exceeds a preset threshold, the PDCCH search space for monitoring the PDCCH based on the position of the first PDCCH search space in the PDCCH search space queue. The preset threshold is a maximum number of consecutive PDCCH monitoring periods in which the terminal device is allowed to receive no PDCCH in the first PDCCH search space.

Optionally, the counter may be configured to the terminal device through the configuration information.

It should be understood that the present disclosure does not limit the specific configuration of the counter.

For example, one counter can be configured for each serving cell of the terminal device, or one counter can be configured for each BWP, or even one counter can be configured for each PDCCH search space.

The method for the terminal device to switch the PDCCH search space will be described below from another perspective.

Optionally, the method for the terminal device to switch the PDCCH search space may include part or all of the following steps.

Step 1:

The terminal device receives the RRC configuration information of a network. The RRC configuration information is used to configure related parameters of the DL BWP. If the WUS is used to adjust the activated PDCCH search space, the RRC configuration information may further include DRX parameter configuration and WUS parameter configuration. For example, configuration information received by the terminal device may include at least one of:

a) a BWP configuration parameter including at least one DL BWP;

b) at least one PDCCH search space configured for each DL BWP, where different PDCCH search spaces correspond to different PDCCH monitoring periods;

c) an initially activated PDCCH search space included in the at least one PDCCH search space configured for each DL BWP;
d) the SSInactivityTimer configured for each DL BWP. This timer may be the longest time during which the UE is allowed to receive no PDCCH in the activated PDCCH search space; or a Search Space Inactivity Counter (SSInactivityCounter) may be configured for each DL BWP; this counter may be the maximum number of consecutive PDCCH monitoring periods in which the UE is allowed to receive no PDCCH in the activated PDCCH search space;
e) a DRX configuration parameter, such as a DRX cycle, drx-onDurationTimer, etc.; and
f) a WUS configuration parameter, including a WUS occasion cycle (which is an integer multiple of the DRX cycle) and a time offset WUSTimeOffset between start time of a WUS occasion and start time of a subsequent DRX on duration.

Step 2:

When the terminal device switches to a certain DL BWP, the initially activated PDCCH search space of the terminal device on this new DL BWP can be determined based on the following method.

If the terminal device receives signaling indicating a PDCCH search space to be used by the terminal device as the initially activated PDCCH search space on this new DL BWP, e.g., a PDCCH indicating switching of the DL BWP received by the terminal device further carries an indication of an activated PDCCH search space, the terminal device may determine an activated PDCCH search space indicated in the received signaling as the initially activated PDCCH search space of the terminal device on this new DL BWP.

If the terminal device receives no signaling indicating a PDCCH search space to be used by the terminal device as the initially activated PDCCH search space on this new DL BWP, the terminal device may determine the initially activated PDCCH search space of the terminal device configured by the RRC in step 1 on this new DL BWP as the initially activated PDCCH search space of the terminal device on this new DL BWP.

Step 3:

The terminal device may receive PDCCH search space switching information transmitted from the network. The switching information may indicate a target PDCCH search space of the PDCCH search space switching performed by the terminal device. The PDCCH search space switching information may be a WUS, an MAC CE, or a PDCCH.

Step 4:

For the currently activated DL BWP, if the currently activated DL BWP is configured with a corresponding SSInactivityTimer or SSInactivityCounter, the terminal device may perform PDCCH search space switching based on the SSInactivityTimer or the SSInactivityCounter-PDCCH.

For example, the terminal device may switch the PDCCH search space based on the SSInactivityTimer.

Specifically, all PDCCH search spaces configured on a current DL BWP may be sorted in an ascending order based on PDCCH monitoring periods corresponding to the all PDCCH search spaces. When switching to a certain PDCCH search space, the terminal device may start or restart the SSInactivityTimer. Each time after the terminal device receives a PDCCH at a time-frequency position corresponding to a current PDCCH search space, the SSInactivityTimer may be restarted. After an expiry of the SSInactivityTimer, if the current PDCCH search space is not the last PDCCH search space in the PDCCH search space queue determined at step 1 (i.e., not the PDCCH search space with the longest PDCCH monitoring period in all PDCCH search spaces configured on the current DL BWP), the terminal device may automatically switch to a PDCCH search space following the current PDCCH search space in the PDCCH search space queue determined at step 1; otherwise, the terminal device may perform no switching of the PDCCH search space.

For another example, the terminal device may switch the PDCCH search space based on a counter Counter.

Specifically, all PDCCH search spaces configured on the current DL BWP may be sorted in an ascending order based on the PDCCH monitoring periods corresponding to the all PDCCH search spaces. When switching to a certain PDCCH search space, the terminal device initializes or resets the counter Counter to be 0. Within a time range of each PDCCH monitoring period corresponding to the current PDCCH search space, the terminal device may maintain the Counter in the following manner. If receiving a PDCCH at the time-frequency position corresponding to the current PDCCH search space within the time range of the current PDCCH monitoring period, the terminal device may reset the counter Counter to be 0. If receiving no PDCCH at the time-frequency position corresponding to the current PDCCH search space within the time range of the current PDCCH monitoring period, the terminal device may increase the counter Counter by 1.

Step 5:

When the Counter is equal to the SSInactivityCounter, that is, when a number of consecutive PDCCH monitoring periods in which the terminal device receives no PDCCH in the current PDCCH search space reaches the maximum number configured by the network, of consecutive PDCCH monitoring periods in which the terminal device is allowed to receive no PDCCH in a certain PDCCH search space, if the current PDCCH search space is not the last PDCCH search space in the PDCCH search space queue determined at step 1 (i.e., not the PDCCH search space with the longest PDCCH monitoring period in all PDCCH search spaces configured on the current DL BWP), the terminal device may automatically switch to a PDCCH search space following the current PDCCH search space in the PDCCH search space queue determined at step 1, otherwise the terminal device may perform no switching of the PDCCH search space.

Figure 3:
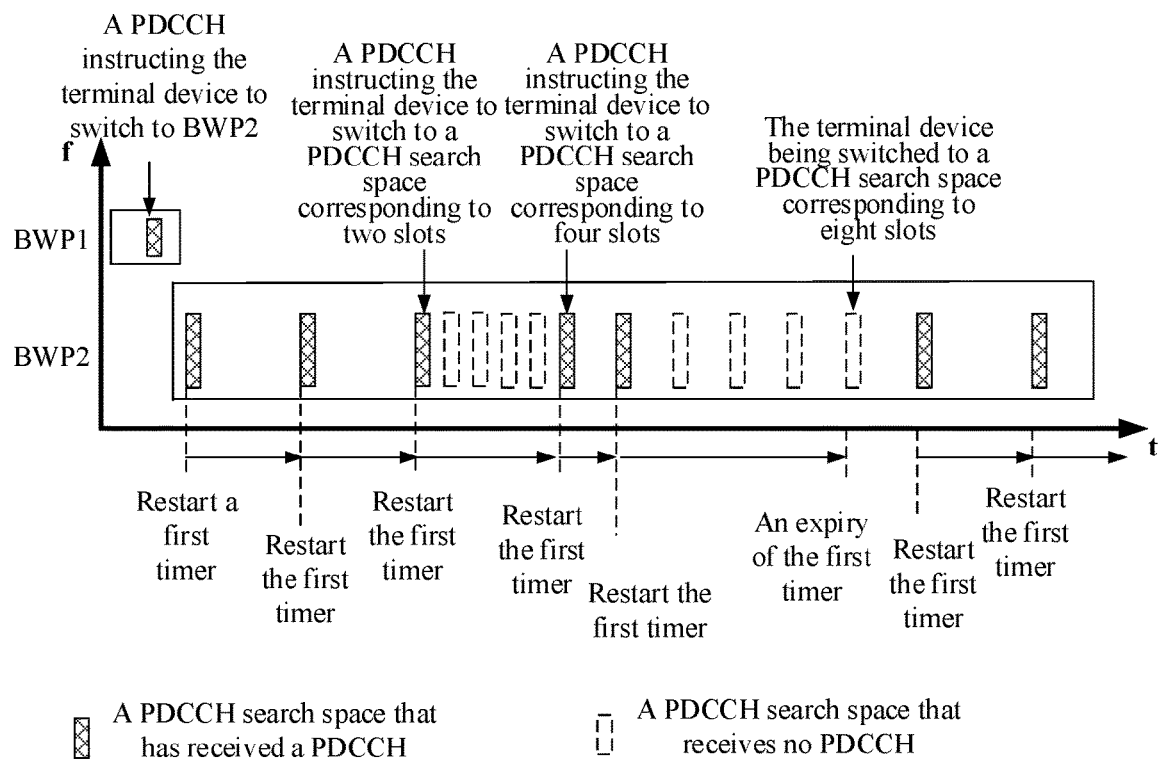

FIG. 3 is a schematic block diagram illustrating a method for a terminal device to switch a PDCCH search space for monitoring a PDCCH based on third indication information and the first timer according to an embodiment of the present disclosure.

It is assumed that the RRC configuration information, which is transmitted by the network device, received by the terminal device includes the following information:
a) two DL BWPs, i.e. a DL BWP1 and a DL BWP2;
b) For the DL BWP1, one PDCCH search space may be configured. The PDCCH monitoring period corresponding to the PDCCH search space has four slots;
c) For the DL BWP2, three PDCCH search spaces may be configured. PDCCH monitoring periods corresponding to the three PDCCH search spaces has two slots, four slots and eight slots, respectively. The PDCCH search space corresponding to the PDCCH monitoring period of eight slots may be the initially activated PDCC search space on the DL BWP2; and
d) One SSInactivityTimer may be configured for each of the DL BWP1 and the DL BWP2. Each of a time length of the SSInactivityTimer corresponding to the DL BWP1 and a time length of the SSInactivityTimer corresponding to the DL BWP2 has sixteen slots.

Referring to FIG. 3, it is assumed that the terminal device receives a PDCCH for instructing the terminal device to switch to the DL BWP2, and the PDCCH does not carry an indication of the initially activated PDCCH search space on the DL BWP2 to which the terminal device switches. The terminal device may switch to the DL BWP2 based on the instruction of the PDCCH, and the terminal device may determine the initially activated PDCCH search space in RRC configuration, i.e., the PDCCH search space corresponding to the PDCCH monitoring period of eight slots, as the PDCCH search space to be activated on the DL BWP2.

With continued reference to FIG. 3, after the terminal device switches to the DL BWP2, the terminal device may start the first timer corresponding to the DL BWP2 when the first PDCCH search space on the DL BWP2 starts. The terminal device may restart the first timer every time the terminal device receives a PDCCH at the time-frequency resource position corresponding to the currently activated PDCCH search space.

With continued reference to FIG. 3, assuming that the terminal device receives a PDCCH instructing the terminal device to switch to the PDCCH search space corresponding to two slots, the terminal device may switch to the PDCCH search space corresponding to two slots.

Further, the terminal device may restart the first timer after switching to the PDCCH search space corresponding to two slots.

With continued reference to FIG. 3, assuming that the terminal device receives a PDCCH instructing the terminal device to switch to the PDCCH search space corresponding to four slots, the terminal device may switch to the PDCCH search space corresponding to four slots.

Further, the terminal device may restart the first timer after switching to the PDCCH search space corresponding to four slots.

With continued reference to FIG. 3, assuming that the first timer expires and the currently activated PDCCH search space of the terminal device is the PDCCH search space corresponding to the PDCCH monitoring period of four slots, the terminal device may switch to the PDCCH search space corresponding to the PDCCH monitoring period of eight slots.

In a CA scenario, the method described in any of the above embodiments may be used to implement switching the PDCCH search space of each serving cell by the terminal device.

Embodiment 2

In the CA scenario, a bundling relationship among a plurality of serving cells can also be established. An adjustment of the PDCCH monitoring period of one cell of the plurality of serving cells may trigger an adjustment of the PDCCH monitoring period of another serving cell that is bundled with the one cell.

In the CA scenario, the network device may configure at least one BWP for each serving cell of the terminal device, and the network device may configure at least one PDCCH search space for each BWP. Different PDCCH search spaces may correspond to different PDCCH monitoring periods. At each moment, only one PDCCH search space may be activated. That is, the terminal device may only monitor the PDCCH at a time-frequency resource position corresponding to this activated PDCCH search space.

In addition, the network device can divide serving cells of the terminal device into at least one group of cells (also referred to as a set of cells). Each group of cells may have one second serving cell (also referred to as a primary cell of a PDCCH search space adjustment) and at least one first serving cell (also referred to as an associated cell of the PDCCH search space adjustment). The second serving cell can switch the PDCCH search space in accordance with the solutions in Embodiment 1 to Embodiment 2 described above. When the PDCCH search space of the second serving cell is adjusted to a PDCCH search space corresponding to a longer or shorter PDCCH monitoring period, each first serving cell of the at least one first serving cell may also be adjusted accordingly to a PDCCH search space corresponding to a longer or shorter PDCCH monitoring period.

It should be understood that the first serving cell may be a primary cell or a secondary cell in the CA, and the present disclosure is not limited to any of these examples.

Similarly, the second serving cell may be a primary cell or a secondary cell in the CA, and the present disclosure is not limited to any of these examples.

In some embodiments of the present disclosure, it is assumed that the currently activated first BWP of the terminal device belongs to the first serving cell. In this case, the terminal device may switch the PDCCH search space of the first serving cell based on a switching result of the PDCCH search space of the second serving cell.

For example, the terminal device may switch the PDCCH search space for monitoring the PDCCH based on the switching result and the position of the first PDCCH search space that is activated and corresponds to the first BWP in the PDCCH search space queue. The PDCCH search space queue is formed by sorting all PDCCH search spaces corresponding to the first BWP in an ascending order based on the PDCCH monitoring periods.

Optionally, when the PDCCH search space of the second serving cell is switched to a PDCCH search space with a longer PDCCH monitoring period, and the first PDCCH search space is not the last PDCCH search space in the PDCCH search space queue, the terminal device may switch the PDCCH search space for monitoring the PDCCH corresponding to the first BWP to a PDCCH search space following the first PDCCH search space in the PDCCH search space queue.

Optionally, in addition or alternatively, when the PDCCH search space of the second serving cell is switched to a PDCCH search space with a shorter PDCCH monitoring period, and the first PDCCH search space is not a first PDCCH search space in the PDCCH search space queue, the terminal device may switch the PDCCH search space for monitoring the PDCCH corresponding to the first BWP to a PDCCH search space immediately preceding the first PDCCH search space in the PDCCH search space queue.

The method for switching the PDCCH search space according to the embodiment will be described below from another perspective.

Optionally, the method for switching the PDCCH search space may include part or all of the following steps:

Step 1:

The RRC configuration information transmitted by the network device to the terminal device may include at least one of:

a) the second serving cell and at least one first serving cell;

b) BWP configuration parameter of each of the second serving cell and each first serving cell may include at least one DL BWP;

c) at least one PDCCH search space configured for each DL BWP. Different PDCCH search spaces may correspond to different PDCCH monitoring periods;

d) one initially activated PDCCH search space included in at least one PDCCH search space configured for each DL BWP; and e) bundling information of the serving cells. That is, all serving cells of the terminal device may be grouped. For each group of cells, one second serving cell and at least one first serving cell may be set. A switching result of the PDCCH search space of the second serving cell may be used to instruct the terminal device to switch the PDCCH search space of each first serving cell.

Step 2:

When the terminal device switches to a certain DL BWP, the initially activated PDCCH search space of the terminal device on this new DL BWP may be determined first. A method for determining the initially activated PDCCH search space can refer to the description of the embodiments. To avoid repetition, details thereof will be omitted here.

Step 3:

For each activated serving cell of the terminal device, all PDCCH search spaces of the terminal device configured on a current DL BWP of the serving cell may be sorted in an ascending order based on PDCCH monitoring periods corresponding to the all PDCCH search spaces.

Step 4:

For each activated serving cell of the terminal device, if the serving cell is a primary cell of the PDCCH search space adjustment, or the serving cell is an associated cell of the PDCCH search space adjustment and a primary cell of the PDCCH search space adjustment associated with the associated cell is currently in a deactivated state, the method provided in Embodiment 1 can be used to adjust the PDCCH search space of the terminal device on the current BWP of the cell.

If the serving cell is an associated cell of the PDCCH search space adjustment, and a primary cell of the PDCCH search space adjustment associated with the associated cell is currently in an activated state, the terminal device can adjust, based on the switching result of the primary cell of the PDCCH search space adjustment associated with the associated cell, the PDCCH search space of the serving cell on the current BWP.

For example, if the primary cell of the PDCCH search space adjustment associated with the cell is adjusted to a corresponding PDCCH search space with a longer PDCCH monitoring period, and the current PDCCH search space of the terminal device in the cell is not the last PDCCH search space in the PDCCH search space queue determined at step 3 (i.e., not the PDCCH search space with the longest PDCCH monitoring period in all PDCCH search spaces configured on the current DL BWP), the terminal device may switch to, on the serving cell, a PDCCH search space following the current PDCCH search space in the PDCCH search space queue determined at step 3.

For another example, if the primary cell of the PDCCH search space adjustment associated with the cell is adjusted to a corresponding PDCCH search space with a shorter PDCCH monitoring period, and the current PDCCH search space of the terminal device in the cell is not the first PDCCH search space in the PDCCH search space queue determined at step 3 (i.e., not the PDCCH search space with the shortest PDCCH monitoring period in all PDCCH search spaces configured on the current DL BWP), the terminal device may switch to, on the serving cell, a PDCCH search space immediately preceding the current PDCCH search space in the PDCCH search space queue determined at step 3.

Figure 4:
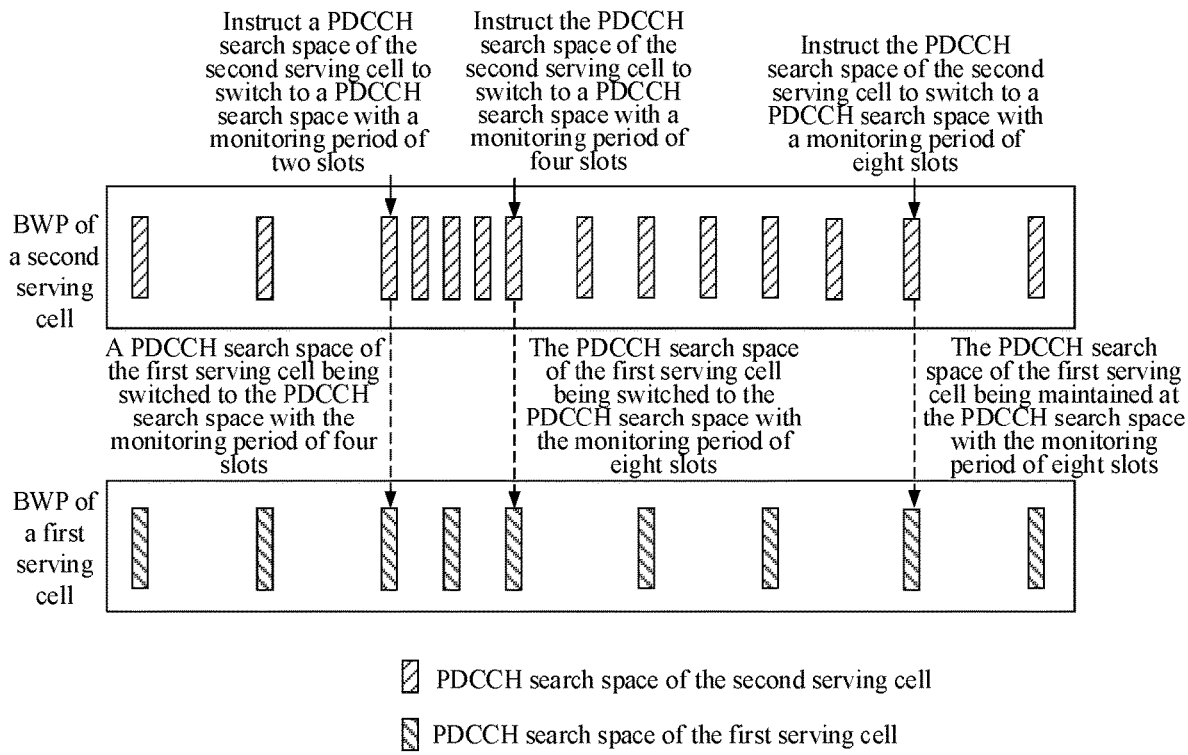

FIG. 4 is a schematic block diagram illustrating a method for a terminal device to switch a PDCCH search space of a first serving cell based on a switching result of a second serving cell according to an embodiment of the present disclosure.

It is assumed that the terminal device receives the configuration information transmitted by the network device, and the configuration information includes:

a) one primary cell of a PDCCH search space adjustment (i.e., the second serving cell) and one associated cell of a PDCCH search space adjustment (i.e., the first serving cell);

b) one DL BWP may be configured for each of the second serving cell and the first serving cell;

c) three PDCCH search spaces may be configured for each of DL BWPs on the second serving cell and the first serving cell. PDCCH monitoring periods corresponding to the three PDCCH search spaces may be two slots, four slots, and eight slots, respectively. For the second serving cell and the first serving cell, a PDCCH search space corresponding to the PDCCH monitoring period of eight slots may be an initially activated PDCCH search space of the terminal device on the serving cell; and d) a bundling relationship between the second serving cell and the first serving cell may be configured. The second serving cell may be the primary cell of the PDCCH search space adjustment, and the first serving cell may be the associated cell of the PDCCH search space adjustment associated with the second serving cell.

It is assumed that in an initial state, the initially activated PDCCH search space of the terminal device on each of the second serving cell and the first serving cell is the PDCCH search space corresponding to the PDCCH monitoring period of eight slots.

Referring to FIG. 4, if the terminal device receives a PDCCH instructing the terminal device to switch to the PDCCH search space corresponding to the PDCCH monitoring period of two slots on the second serving cell, the terminal device may switch, based on the instruction of the PDCCH, to the PDCCH search space corresponding to the PDCCH monitoring period of two slots on the second serving cell, and at the same time, the terminal device may switch to the PDCCH search space corresponding to the PDCCH monitoring period of four slots on the first serving cell.

With continued reference to FIG. 4, if the terminal device receives a PDCCH instructing the terminal device to switch to the PDCCH search space corresponding to the PDCCH monitoring period of four slots on the second serving cell, the terminal device may switch, based on the instruction of the PDCCH, to the PDCCH search space corresponding to the PDCCH monitoring period of four slots on the second serving cell, and at the same time, the terminal device may switch to the PDCCH search space corresponding to the PDCCH monitoring period of eight slots on the first serving cell.

With continued reference to FIG. 4, if the terminal device receives a PDCCH instructing the terminal device to switch to the PDCCH search space corresponding to the PDCCH monitoring period of eight slots on the second serving cell, the terminal device may switch, based on the instruction of the PDCCH, to the PDCCH search space corresponding to the PDCCH monitoring period of eight slots on the second serving cell, and at the same time the PDCCH search space of the terminal device on the first serving cell may remain unchanged.

Embodiment 3

The terminal device may further switch the PDCCH search space of the first serving cell based on the switching result of the second serving cell and/or a timer.

For example, only a second timer may be adopted to trigger the terminal device to switch the PDCCH search space of the first serving cell. A time length of the second timer may be a maximum time length during which the terminal device is allowed to receive no PDCCH in the first PDCCH search space that is activated. Specifically, as in the method for switching the PDCCH search space described in Embodiment 1, the terminal device may directly switch, based on a position of the currently activated PDCCH search space in the PDCCH search space queue, the PDCCH search space of the first serving cell after an expiry of the second timer. For example, after the expiry of the second timer, the terminal device may switch the PDCCH search space of the first serving cell to a PDCCH search space with a longer monitoring period.

For another example, the terminal device may only use the switching result of the second serving cell to trigger the terminal device to switch the PDCCH search space of the first serving cell. Specifically, as in the method for switching the PDCCH search space described in Embodiment 2, the terminal device may switch, based on the switching result of the second serving cell, the PDCCH search space of the first serving cell to a PDCCH search space with a longer or shorter monitoring period.

For yet another example, the terminal device may switch the PDCCH search space of the first serving cell in combination with the switching result of the second serving cell and the second timer. For example, the terminal device may switch, based on the switching result of the PDCCH search space of the second serving cell, the PDCCH search space of the first serving cell after the expiry of the second timer. That is, both the expiry of the second timer and a PDCCH switching result of the second serving cell may be used to trigger the terminal device to switch the PDCCH search space of the first serving cell for receiving the PDCCH, such that a switching frequency of the PDCCH search space of the first serving cell is smaller than or equal to a switching frequency of the PDCCH search space of the second serving cell, thereby avoiding frequent switching of the PDCCH search space of the first serving cell.

Optionally, when receiving a PDCCH in the first PDCCH search space, the terminal device may start or restart the second timer; and/or, when switching of the PDCCH search space is completed, the terminal device may start or restart the second timer.

Each of the switching result of the PDCCH search space of the second serving cell and the second timer may individually trigger the terminal device to switch the PDCCH search space of the first serving cell. In this case, in order to prevent the terminal device from frequently switching the PDCCH search space of the first serving cell (e.g., after the second timer expires and the switching of the PDCCH search space of the first serving cell is completed, switching of the PDCCH search space of the second serving cell may trigger the terminal device to switch the PDCCH search space of the first serving cell again), a third timer may be used to control a frequency at which the terminal device switches the PDCCH search space of the first serving cell.

For example, after the expiry of both the second timer and the third timer, the terminal device may be triggered to switch the PDCCH search space of the first serving cell based on the switching result of the PDCCH search space of the second serving cell.

Of course, it is also possible to trigger the terminal device to switch the PDCCH search space of the first serving cell only through the switching result of the second serving cell and the third timer, so as to avoid frequent switching of the PDCCH search space of the first serving cell.

For example, after the expiry of the third timer, the terminal device may switch the PDCCH search space of the first serving cell based on the switching result of the PDCCH search space of the second serving cell. A time length of the third timer is a minimum time interval during which the terminal device is allowed to switch the PDCCH search space.

Further, after the expiry of both the second timer and the third timer, the terminal device may switch the PDCCH search space of the first serving cell based on the switching result of the PDCCH search space of the second serving cell.

Optionally, when receiving a PDCCH in the first PDCCH search space that is activated and corresponds to the first BWP, the terminal device may start or restart the third timer; and/or when completing the switching of the PDCCH search space, the terminal device may start or restart the third timer.

The method for the terminal device to switch the PDCCH search space will be described below from another perspective.

In the CA scenario, the network device may establish the bundling relationship among the plurality of serving cells. An adjustment of the PDCCH monitoring period of one cell of the plurality of serving cells may be determined as one of the conditions for triggering adjustment of the PDCCH monitoring period of another serving cell with which the one cell of the plurality of serving cells is bundled. For these serving cells, adjustments of PDCCH monitoring periods of these serving cells may be implemented in combination with a timer.

Optionally, the method for switching the PDCCH search space may include part or all of the following steps:

Step 1:

The terminal device may receive the RRC configuration information transmitted by the network device. The RRC configuration information may be used to configure related parameters of the first serving cell, e.g., related parameters of the DL BWP, and bundling configuration information of the serving cells. Specifically, the RRC configuration information may include at least one of:

a) at least one first serving cell included in configuration parameters of the first serving cell;

b) at least one DL BWP included in BWP configuration parameters of the second serving cell and each first serving cell;

c) at least one PDCCH search space configured for each DL BWP. Different PDCCH search spaces may correspond to different PDCCH monitoring periods;

d) one initially activated PDCCH search space included in at least one PDCCH search space configured for each DL BWP;

e) bundling information of the serving cells refers to grouping all serving cells of the terminal device. For each group of cells, a primary cell of a PDCCH search space adjustment may be set. The other serving cells in the group may be associated cells of the PDCCH search space adjustment; and f) for each group of serving cells, two timers SSInactivityTimer and SSProhibitTimer may be configured for each of associated cells of the PDCCH search space adjustment. The timer SSInactivityTimer is a maximum time length during which the terminal device is allowed to receive no PDCCH in the activated PDCCH search space, and the timer SSProhibitTimer is a minimum time interval only after which the terminal device is allowed to adjust the PDCCH search space.

Step 2:

When the terminal device switches to a certain DL BWP, the initially activated PDCCH search space of the terminal device on this new DL BWP may be determined first. A method for determining the initially activated PDCCH search space can refer to the method in Embodiment 1. To avoid repetition, details thereof will be omitted here.

Step 3:

For each activated serving cell of the terminal device, all PDCCH search spaces of the terminal device configured on the current DL BWP of the serving cell may be sorted in an ascending order based on PDCCH monitoring periods corresponding to the all PDCCH search spaces to form the PDCCH search space queue.

Step 4:

For each activated serving cell of the terminal device, if the serving cell is a primary cell of the PDCCH search space adjustment, or the serving cell is an associated cell of the PDCCH search space adjustment and a primary cell of the PDCCH search space adjustment associated with the associated cell is currently in an deactivated state, the method provided in Embodiment 2 or Embodiment 3 may be used to adjust the PDCCH search space of the terminal device on the current BWP of the cell.

If the serving cell is an associated cell of the PDCCH search space adjustment and a primary cell of the PDCCH search space adjustment associated with the associated cell is currently in an activated state, the PDCCH search space of the terminal device on the current BWP of the cell may be adjusted based on an adjustment result of the primary cell of the PDCCH search space adjustment associated with the associated cell.

Step 5:

The terminal device can switch the PDCCH search space based on the SSInactivityTimer and the SSProhibitTimer only.

For example, when switching to a certain PDCCH search space, the terminal device may start or restart the SSInactivityTimer and the SSProhibitTimer. Each time the terminal device receives a PDCCH at a time-frequency position corresponding to the current PDCCH search space, the SSInactivityTimer and the SSProhibitTimer may be restarted.

After the expiry of the SSInactivityTimer, if the current PDCCH search space is not the last PDCCH search space in the PDCCH search space queue determined at step 3 (i.e., not the PDCCH search space with the longest PDCCH monitoring period in all PDCCH search spaces configured on the current DL BWP), the terminal device may automatically switch to a PDCCH search space following the current PDCCH search space in the PDCCH search space queue determined at step 3, otherwise the terminal device may perform no switching of the PDCCH search space.

Step 6:

The terminal device may adjust the PDCCH search space based on an associated primary cell of the PDCCH search space adjustment and in combination with the timer SSProhibitTimer.

If the primary cell of the PDCCH search space adjustment associated with the cell is adjusted to a corresponding PDCCH search space with a longer PDCCH monitoring period, the timer SSProhibitTimer of the terminal device in the cell has expired, and the current PDCCH search space of the terminal device in the cell is not the last PDCCH search space in the PDCCH search space queue determined at step 3 (i.e., not the PDCCH search space with the longest PDCCH monitoring period in all PDCCH search spaces configured on the current DL BWP), the terminal device may switch to, on the serving cell, a PDCCH search space following the current PDCCH search space in the PDCCH search space queue determined at step 3.

If the primary cell of the PDCCH search space adjustment associated with the cell is adjusted to a corresponding PDCCH search space with a shorter PDCCH monitoring period, the timer SSProhibitTimer of the terminal device in the cell has expired, and the current PDCCH search space of the terminal device in the cell is not the first PDCCH search space in the PDCCH search space queue determined at step 3 (i.e., not the PDCCH search space with the shortest PDCCH monitoring period in all PDCCH search spaces configured on the current DL BWP), the terminal device may switch to, on the serving cell, a PDCCH search space immediately preceding the current PDCCH search space in the PDCCH search space queue determined at step 3.

Figures 5, 6:
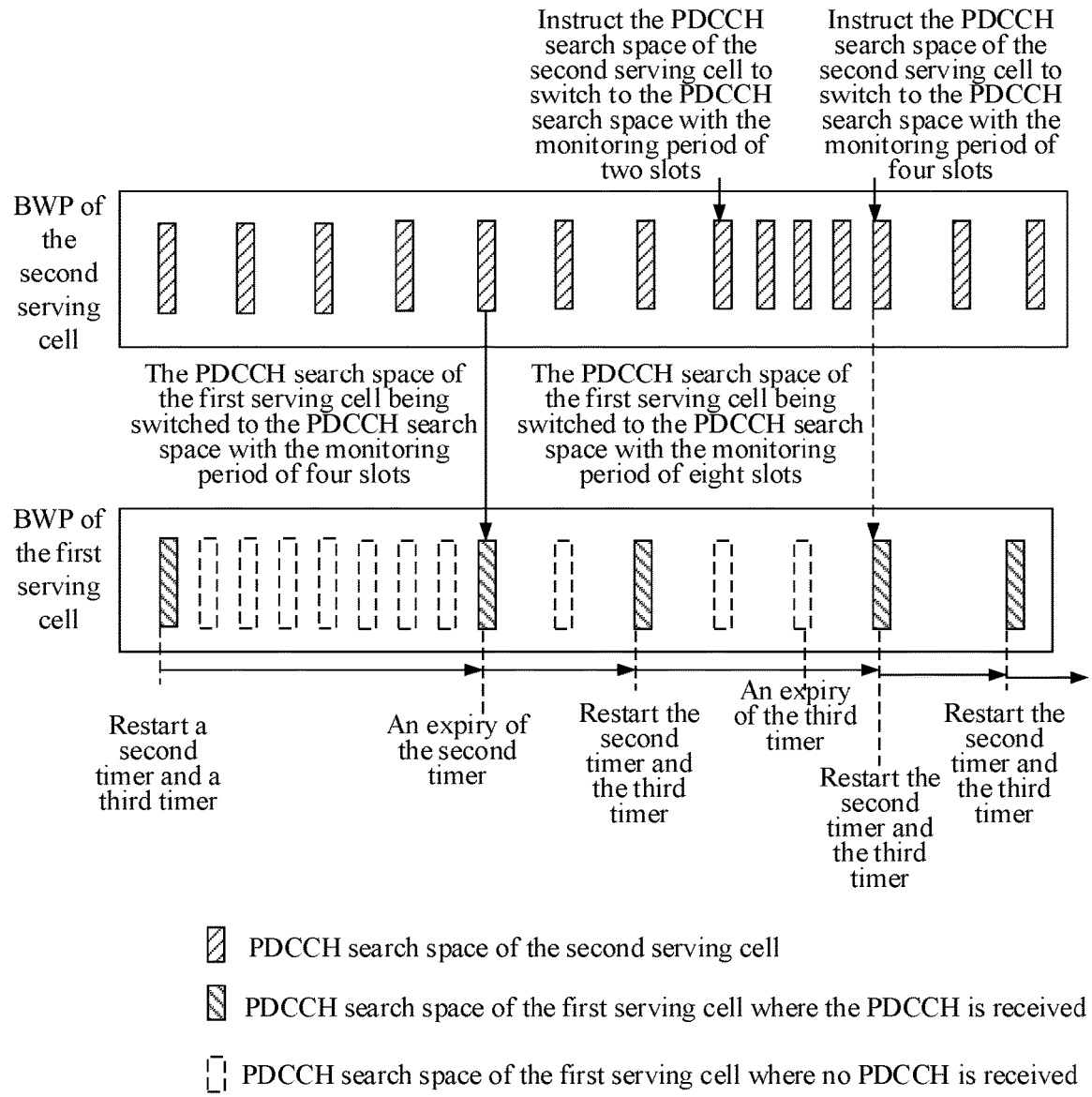
FIG. 6 is a schematic flowchart illustrating a method for switching a PDCCH search space for transmitting a PDCCH according to an embodiment of the present disclosure.

FIG. 5 is a schematic block diagram illustrating a method for a terminal device to switch a PDCCH search space according to an embodiment of the present disclosure.

It is assumed that the terminal device receives the RRC configuration information transmitted by the network device. The RRC configuration information may include:
a) one second serving cell and one first serving cell;
b) one DL BWP may be configured for each of the second serving cell and the first serving cell;
c) three PDCCH search spaces may be configured for each of DL BWPs on the second serving cell and the first serving cell. PDCCH monitoring periods corresponding to the three PDCCH search spaces may be two slots, four slots, and eight slots, respectively. The PDCCH search space corresponding to the PDCCH monitoring period of four slots on the second serving cell may be an initially activated PDCC search space, and the PDCCH search space corresponding to the PDCCH monitoring period of two slots on the first serving cell may be an initially activated PDCC search space;
d) a bundling relationship between the second serving cell and the first serving cell may be configured. The second serving cell may be a primary cell of the PDCCH search space adjustment, and the first serving cell may be an associated cell of the PDCCH search space adjustment associated with the second serving cell; and
e) for the first serving cell, the second timer (SSInactivityTimer) and the third timer (SSProhibitTimer) may be configured as sixteen slots and eight slots, respectively.

Referring to FIG. 5, for the first serving cell, the terminal device may start or restart the SSInactivityTimer and the SSProhibitTimer every time the terminal device starts to use a certain PDCCH search space, or after the terminal device receives a PDCCH at a time-frequency position corresponding to the current PDCCH search space.

With continued reference to FIG. 5, in response to an expiry of the SSInactivityTimer, the PDCCH search space of the terminal device on the first serving cell may be automatically adjusted to the PDCCH search space corresponding to the PDCCH monitoring period of four slots.

With continued reference to FIG. 5, when receiving a PDCCH instructing the terminal device to switch to the PDCCH search space corresponding to the PDCCH monitoring period of two slots on the second serving cell, the terminal device may switch, based on the instruction of the PDCCH, to the PDCCH search space corresponding to the PDCCH monitoring period of two slots on the second serving cell. For the first serving cell, since the SSProhibit-Timer has not timed out, the PDCCH search space of the terminal device on the first serving cell may remain unchanged.

With continued reference to FIG. 5, when receiving a PDCCH instructing the terminal device to switch to the PDCCH search space corresponding to the PDCCH monitoring period of four slots on the second serving cell, the terminal device may switch, based on the instruction of the PDCCH, to the PDCCH search space corresponding to the PDCCH monitoring period of four slots on the second serving cell. For the first serving cell, due to the expiry of the SSProhibitTimer, the PDCCH search space of the terminal device on the first serving cell may be accordingly adjusted to the PDCCH search space corresponding to the PDCCH monitoring period of eight slots.

Based on the above technical solutions, the method for switching the PDCCH search space of the present disclosure can dynamically adjust the PDCCH search space used by the terminal based on actual scheduling situations, thereby adjusting the PDCCH monitoring period corresponding to the PDCCH search space. For example, the PDCCH monitoring period of the terminal can be better matched with actual scheduling. A shorter PDCCH monitoring period can be used in a case of dense scheduling, and a longer PDCCH monitoring period can be used in a case of a long scheduling interval, thereby reducing energy consumption of the terminal device.

For the solution provided in Embodiment 1, the PDCCH monitoring period can be adjusted more flexibly.

For the solution provided in Embodiment 2, the method for adjusting the PDCCH monitoring period in a linkage manner can save control signaling overhead.

The solution provided in Embodiment 3, on a basis of the solution in Embodiment 2, realizes an adjustment of the PDCCH monitoring period using a linkage manner in combination with the timer with respect to associated cells of PDCCH monitoring period adjustment. Compared with the solution in Embodiment 2, this adjustment mechanism of the PDCCH monitoring period is improved.

Preferred embodiments of the present disclosure are described in detail above with reference to the accompanying drawings. However, the present disclosure is not limited to specific details in the above embodiments. Many simple modifications can be made to the technical solutions of the present disclosure within the scope of the technical concept of the present disclosure. These simple modifications all belong to the scope of the present disclosure.

For example, various specific technical features described in the above specific embodiments can be combined in any suitable manner without contradiction. To avoid unnecessary repetition, various possible combinations will not be described separately in the present disclosure.

For another example, arbitrary combinations can also be performed on various different implementations of the present disclosure. As long as these arbitrary combinations do not violate the concept of the present disclosure, these arbitrary combinations should also be regarded as the content disclosed in the present disclosure.

It should be understood that, in the various method embodiments of the present disclosure, numerical values of sequence numbers of the above processes do not mean an execution order. The execution order of each process should be determined by its function and internal logic, and should not constitute any limitation to the implementation process of the embodiments of the present disclosure.

The method for switching the PDCCH search space for monitoring a PDCCH according to an embodiment of the present disclosure is described in detail above in combination with FIGS. 2 to 5 from the perspective of the terminal device, and the method for switching the PDCCH search space for transmitting a PDCCH according to an embodiment of the present disclosure will be described below in combination with FIG. 6 from the perspective of the network device.

FIG. 6 is a schematic flowchart illustrating a method 300 for switching a PDCCH search space according to an embodiment of the present disclosure. The method 300 may be performed by the network device as illustrated in FIG. 1. As illustrated in FIG. 6, the method 300 may include the following step.

At step S310, a network device switches, within a plurality of PDCCH search spaces corresponding to a first BWP, a PDCCH search space for transmitting a PDCCH. Different PDCCH search spaces correspond to different PDCCH monitoring periods.

In some embodiments of the present disclosure, the method may further include: switching, by the network device, a BWP for transmitting data from the first BWP to a second BWP; determining, by the network device, an initially activated PDCCH search space in at least one PDCCH search space corresponding to the second BWP; and transmitting, by the network device, a PDCCH in the initially activated PDCCH search space.

In some embodiments of the present disclosure, the method may further include transmitting, by the network device, first indication information. The first indication information indicates the initially activated PDCCH search space.

In some embodiments of the present disclosure, transmitting, by the network device, the first indication information includes transmitting, by the network device, RRC configuration information. The RRC configuration information includes the first indication information.

In some embodiments of the present disclosure, transmitting, by the network device, the first indication information includes transmitting, by the network device, a PDCCH carrying second indication information. The second indication information is used to instruct the terminal device to switch the BWP for receiving the data. The PDCCH carrying the second indication information includes the first indication information.

In some embodiments of the present disclosure, switching a PDCCH search space for transmitting a PDCCH includes: transmitting, by the network device, third indication information indicating a target PDCCH search space; and switching, by the network device, the PDCCH search space for transmitting the PDCCH to the target PDCCH search space.

In some embodiments of the present disclosure, the third indication information is carried in a WUS, a MAC CE, or a PDCCH.

In some embodiments of the present disclosure, switching a PDCCH search space for transmitting a PDCCH includes switching, by the network device based on a position of a first PDCCH search space that is activated and corresponds to the first BWP in a PDCCH search space queue, the PDCCH search space for transmitting the PDCCH. The PDCCH search space queue is formed by sorting all PDCCH search spaces corresponding to the first BWP in an ascending order based on PDCCH transmitting periods.

In some embodiments of the present disclosure, switching, by the network device based on the position of the first PDCCH search space that is activated and corresponds to the first BWP in the PDCCH search space queue, the PDCCH search space for transmitting the PDCCH includes switching, by the network device, to a PDCCH search space following the first PDCCH search space in the PDCCH search space queue, when the first PDCCH search space is not a last PDCCH search space in the PDCCH search space queue.

In some embodiments of the present disclosure, the method may further include maintaining, by the network device, the first PDCCH search space as an activated PDCCH search space, when the first PDCCH search space is the last PDCCH search space in the PDCCH search space queue.

In some embodiments of the present disclosure, switching, by the network device based on the position of the first PDCCH search space that is activated and corresponds to the first BWP in the PDCCH search space queue, the PDCCH search space for transmitting the PDCCH includes switching, by the network device after an expiry of a first timer, the PDCCH search space for transmitting the PDCCH based on the position of the first PDCCH search space in the PDCCH search space queue. A time length of the first timer is a maximum time length during which the network device is allowed to transmit no PDCCH in the first PDCCH search space.

In some embodiments of the present disclosure, the method may further include: starting or restarting, by the network device in response to transmitting the PDCCH in the first PDCCH search space, the first timer; and/or starting or restarting, by the network device in response to completing switching of the PDCCH search space, the first timer.

In some embodiments of the present disclosure, switching, by the network device based on the position of the first PDCCH search space that is activated and corresponds to the first BWP in the PDCCH search space queue, the PDCCH search space for transmitting the PDCCH includes switching, by the network device after a counter exceeds a preset threshold, the PDCCH search space for transmitting the PDCCH based on the position of the first PDCCH search space in the PDCCH search space queue. The preset threshold is a maximum number of consecutive PDCCH transmitting periods in which the network device is allowed to transmit no PDCCH in the first PDCCH search space.

In some embodiments of the present disclosure, the method may further include: increasing, by the network device, a value of the counter by 1, when no PDCCH is transmitted in the first PDCCH search space within a PDCCH transmitting period of the first PDCCH search space; and/or resetting, by the network device in response to transmitting the PDCCH in the first PDCCH search space, the counter; and/or resetting, by the network device in response to completing the switching of the PDCCH search space, the counter.

In some embodiments of the present disclosure, the first BWP belongs to a first serving cell. Switching the PDCCH search space for transmitting the PDCCH includes switching, by the network device, a PDCCH search space of the first serving cell based on a switching result of a PDCCH search space of a second serving cell.

In some embodiments of the present disclosure, switching, by the network device, the PDCCH search space of the first serving cell based on the switching result of the PDCCH search space of the second serving cell includes switching, by the network device, the PDCCH search space for transmitting the PDCCH based on the switching result and a position of a first PDCCH search space that is activated and corresponds to the first BWP in a PDCCH search space queue. The PDCCH search space queue is formed by sorting all PDCCH search spaces corresponding to the first BWP in an ascending order based on the PDCCH transmitting periods.

In some embodiments of the present disclosure, switching the PDCCH search space for transmitting the PDCCH includes: switching, by the network device, a PDCCH search space for transmitting the PDCCH corresponding to the first BWP to a PDCCH search space following the first PDCCH search space in the PDCCH search space queue, when the PDCCH search space of the second serving cell is switched to a PDCCH search space with a longer PDCCH transmitting period, and the first PDCCH search space is not the last PDCCH search space in the PDCCH search space queue; and/or switching, by the network device, a PDCCH search space for transmitting the PDCCH corresponding to the first BWP to a PDCCH search space immediately preceding the first PDCCH search space in the PDCCH search space queue, when the PDCCH search space of the second serving cell is switched to a PDCCH search space with a shorter PDCCH transmitting period, and the first PDCCH search space is not the first PDCCH search space in the PDCCH search space queue.

In some embodiments of the present disclosure, switching, by the network device, the PDCCH search space of the first serving cell based on the switching result of the PDCCH search space of the second serving cell includes switching, by the network device after an expiry of a second timer, the PDCCH search space of the first serving cell based on the switching result of the PDCCH search space of the second serving cell. A time length of the second timer is a maximum time length during which the terminal device is allowed to receive no PDCCH in the first PDCCH search space that is activated and corresponds to the first BWP.

In some embodiments of the present disclosure, the method may further include: starting or restarting, by the network device in response to transmitting the PDCCH in the first PDCCH search space, the second timer; and/or starting or restarting, by the network device in response to completing the switching of the PDCCH search space, the second timer.

In some embodiments of the present disclosure, switching, by the network device, the PDCCH search space of the first serving cell based on the switching result of the PDCCH search space of the second serving cell includes switching, by the network device after an expiry of a third timer, the PDCCH search space of the first serving cell based on the switching result of the PDCCH search space of the second serving cell. A time length of the third timer is a minimum time interval during which the network device is allowed to switch the PDCCH search space.

In some embodiments of the present disclosure, the method may further include: starting or restarting, by the network device in response to transmitting a PDCCH in the first PDCCH search space that is activated and corresponds to the first BWP, the third timer; and/or starting or restarting, by the network device in response to completing the switching of the PDCCH search space, the third timer.

In some embodiments of the present disclosure, the method may further include transmitting, by the network device, configuration information. The configuration information includes at least one of: at least one serving cell; at least one BWP corresponding to each serving cell; at least one PDCCH search space corresponding to each BWP; a PDCCH transmitting period corresponding to each PDCCH search space; DRX; and a WUS.

It should be understood that steps in the method 300 for the network device to switch the PDCCH search space for transmitting the PDCCH can refer to corresponding steps in the method 200 for the terminal device to switch the PDCCH search space for monitoring the PDCCH. For brevity, details thereof will be omitted here.

The method embodiments of the present disclosure are described in detail above with reference to FIG. 1 to FIG. 6. Device embodiments of the present disclosure will be described in detail below with reference to FIG. 7 to FIG. 10.

FIG. 7 is a schematic block diagram of a terminal device 400 according to an embodiment of the present disclosure.

Specifically, as illustrated in FIG. 7, the terminal device 400 may include a processing unit 410. The processing unit 410 is configured to switch, within a plurality of PDCCH search spaces corresponding to a first BWP, a PDCCH search space for monitoring a PDCCH. Different PDCCH search spaces correspond to different PDCCH monitoring periods.

In some embodiments of the present disclosure, the processing unit 410 is further configured to: switch a BWP for receiving data from the first BWP to a second BWP; and determine an initially activated PDCCH search space in at least one PDCCH search space corresponding to the second BWP. The terminal device can further include a receiving unit configured to monitor the PDCCH in the initially activated PDCCH search space.

In some embodiments of the present disclosure, the receiving unit is further configured to receive first indication information. The first indication information indicates the initially activated PDCCH search space.

In some embodiments of the present disclosure, the receiving unit is specifically configured to receive RRC configuration information. The RRC configuration information includes the first indication information.

In some embodiments of the present disclosure, the receiving unit is specifically configured to receive a PDCCH carrying second indication information. The second indication information is used to instruct the terminal device to switch the BWP for receiving the data. The PDCCH carrying the second indication information includes the first indication information.

In some embodiments of the present disclosure, the terminal device may further include a receiving unit configured to receive third indication information indicating a target PDCCH search space. The processing unit 410 is specifically configured to switch the PDCCH search space for monitoring the PDCCH to the target PDCCH search space.

In some embodiments of the present disclosure, the third indication information is carried in a WUS, a MAC CE, or the PDCCH.

In some embodiments of the present disclosure, the processing unit 410 is specifically configured to switch, based on a position of a first PDCCH search space that is activated and corresponds to the first BWP in a PDCCH search space queue, the PDCCH search space for monitoring the PDCCH. The PDCCH search space queue is formed by sorting all PDCCH search spaces corresponding to the first BWP in an ascending order based on PDCCH monitoring periods.

In some embodiments of the present disclosure, the processing unit 410 is specifically configured to switch to a PDCCH search space following the first PDCCH search space in the PDCCH search space queue, when the first PDCCH search space is not a last PDCCH search space in the PDCCH search space queue.

In some embodiments of the present disclosure, the processing unit 410 is further configured to maintain the first PDCCH search space as an activated PDCCH search space, when the first PDCCH search space is the last PDCCH search space in the PDCCH search space queue.

In some embodiments of the present disclosure, the processing unit 410 is specifically configured to switch, after an expiry of a first timer, the PDCCH search space for monitoring the PDCCH based on the position of the first PDCCH search space in the PDCCH search space queue. A time length of the first timer is a maximum time length during which the terminal device is allowed to receive no PDCCH in the first PDCCH search space.

In some embodiments of the present disclosure, the processing unit 410 is specifically configured to: start or restart, in response to receiving a PDCCH in the first PDCCH search space, the first timer; and/or start or restart, in response to completing switching of the PDCCH search space, the first timer.

In some embodiments of the present disclosure, the processing unit 410 is specifically configured to switch, after a counter exceeds a preset threshold, the PDCCH search space for monitoring the PDCCH based on the position of the first PDCCH search space in the PDCCH search space queue. The preset threshold is a maximum number of consecutive PDCCH monitoring periods in which the terminal device is allowed to receive no PDCCH in the first PDCCH search space.

In some embodiments of the present disclosure, the processing unit 410 is further configured to: increase a value of the counter by 1, when no PDCCH is received in the first PDCCH search space within a PDCCH monitoring period of the first PDCCH search space; and/or reset, in response to receiving a PDCCH in the first PDCCH search space, the counter; and/or reset, in response to completing the switching of the PDCCH search space, the counter.

In some embodiments of the present disclosure, the first BWP belongs to a first serving cell. The processing unit 410 is specifically configured to switch a PDCCH search space of the first serving cell based on a switching result of a PDCCH search space of a second serving cell.

In some embodiments of the present disclosure, the processing unit 410 is specifically configured to switch the PDCCH search space for monitoring the PDCCH based on the switching result and a position of a first PDCCH search space that is activated and corresponds to the first BWP in a PDCCH search space queue. The PDCCH search space queue is formed by sorting all PDCCH search spaces corresponding to the first BWP in an ascending order based on the PDCCH monitoring periods.

In some embodiments of the present disclosure, the processing unit 410 is specifically configured to: switch a PDCCH search space for monitoring the PDCCH corresponding to the first BWP to a PDCCH search space following the first PDCCH search space in the PDCCH search space queue, when the PDCCH search space of the second serving cell is switched to a PDCCH search space with a longer PDCCH monitoring period, and the first PDCCH search space is not the last PDCCH search space in the PDCCH search space queue; and/or switch a PDCCH search space for monitoring the PDCCH corresponding to the first BWP to a PDCCH search space immediately preceding the first PDCCH search space in the PDCCH search space queue, when the PDCCH search space of the second serving cell is switched to a PDCCH search space with a shorter PDCCH monitoring period, and the first PDCCH search space is not the first PDCCH search space in the PDCCH search space queue.

In some embodiments of the present disclosure, the processing unit 410 is specifically configured to switch, after an expiry of a second timer, the PDCCH search space of the first serving cell based on the switching result of the PDCCH search space of the second serving cell. A time length of the second timer is a maximum time length during which the terminal device is allowed to receive no PDCCH in the first PDCCH search space that is activated and corresponds to the first BWP.

In some embodiments of the present disclosure, the processing unit 410 is further configured to: start or restart, in response to receiving the PDCCH in the first PDCCH search space, the second timer; and/or start or restart, in response to completing the switching of the PDCCH search space, the second timer.

In some embodiments of the present disclosure, the processing unit 410 is specifically configured to switch, after an expiry of a third timer, the PDCCH search space of the first serving cell based on the switching result of the PDCCH search space of the second serving cell. A time length of the third timer is a minimum time interval during which the terminal device is allowed to switch the PDCCH search space.

In some embodiments of the present disclosure, the processing unit 410 is further configured to: start or restart, in response to receiving the PDCCH in the first PDCCH search space that is activated and corresponds to the first BWP, the third timer; and/or start or restart, in response to completing the switching of the PDCCH search space, the third timer.

In some embodiments of the present disclosure, the terminal device can further include a receiving unit configured to receive configuration information. The configuration information includes at least one of: at least one serving cell; at least one BWP corresponding to each serving cell; at least one PDCCH search space corresponding to each BWP; a PDCCH monitoring period corresponding to each PDCCH search space; DRX; and a WUS.

It should be understood that the device embodiments may correspond to the method embodiments, and thus similar description may refer to the method embodiments. Specifically, the terminal device 400 illustrated in FIG. 7 may correspond to a corresponding subject in the method 200 that executes the embodiments of the present disclosure. In addition, the above and other operations and/or functions of the various units in the terminal device 400 are respectively intended to implement corresponding processes in the various methods in FIG. 1. For brevity, details thereof will be omitted here.

FIG. 8 is a schematic block diagram of a network device 500 according to an embodiment of the present disclosure.

Specifically, as illustrated in FIG. 8, the network device 500 may include a processing unit 510. The processing unit 510 is configured to switch, within a plurality of PDCCH search spaces corresponding to a first BWP, a PDCCH search space for transmitting a PDCCH. Different PDCCH search spaces correspond to different PDCCH monitoring periods.

In some embodiments of the present disclosure, the processing unit 510 is further configured to: switch a BWP for transmitting data from the first BWP to a second BWP; and determine an initially activated PDCCH search space in at least one PDCCH search space corresponding to the second BWP. The network device further includes a transmitting unit configured to transmit the PDCCH in the initially activated PDCCH search space.

In some embodiments of the present disclosure, the transmitting unit is further configured to transmit first indication information. The first indication information indicates the initially activated PDCCH search space.

In some embodiments of the present disclosure, the transmitting unit is specifically configured to transmit RRC configuration information. The RRC configuration information includes the first indication information.

In some embodiments of the present disclosure, the transmitting unit is specifically configured to transmit a PDCCH carrying second indication information. The second indication information is used to instruct the terminal device to switch the BWP for receiving the data. The PDCCH carrying the second indication information includes the first indication information.

In some embodiments of the present disclosure, the terminal device may further include a transmitting unit configured to transmit third indication information indicating a target PDCCH search space. The processing unit 510 is specifically configured to switch the PDCCH search space for transmitting the PDCCH to the target PDCCH search space.

In some embodiments of the present disclosure, the third indication information is carried in a WUS, a MAC CE, or a PDCCH.

In some embodiments of the present disclosure, the processing unit 510 is specifically configured to switch, based on a position of a first PDCCH search space that is activated and corresponds to the first BWP in a PDCCH search space queue, the PDCCH search space for transmitting the PDCCH. The PDCCH search space queue is formed by sorting all PDCCH search spaces corresponding to the first BWP in an ascending order based on PDCCH transmitting periods.

In some embodiments of the present disclosure, the processing unit 510 is specifically configured to switch to a PDCCH search space following the first PDCCH search space in the PDCCH search space queue, when the first PDCCH search space is not a last PDCCH search space in the PDCCH search space queue.

In some embodiments of the present disclosure, the processing unit 510 is further configured to maintain the first PDCCH search space as an activated PDCCH search space, when the first PDCCH search space is the last PDCCH search space in the PDCCH search space queue.

In some embodiments of the present disclosure, the processing unit 510 is specifically configured to switch, after an expiry of a first timer, the PDCCH search space for transmitting the PDCCH based on the position of the first PDCCH search space in the PDCCH search space queue. A time length of the first timer is a maximum time length during which the network device is allowed to transmit no PDCCH in the first PDCCH search space.

In some embodiments of the present disclosure, the processing unit 510 is further configured to: start or restart, in response to transmitting the PDCCH in the first PDCCH search space, the first timer; and/or start or restart, in response to completing switching of the PDCCH search space, the first timer.

In some embodiments of the present disclosure, the processing unit 510 is specifically configured to switch, after a counter exceeds a preset threshold, the PDCCH search space for transmitting the PDCCH based on the position of the first PDCCH search space in the PDCCH search space queue. The preset threshold is a maximum number of consecutive PDCCH transmitting periods in which the network device is allowed to transmit no PDCCH in the first PDCCH search space.

In some embodiments of the present disclosure, the processing unit 510 is further configured to: increase a value of the counter by 1, when no PDCCH is transmitted in the first PDCCH search space within a PDCCH transmitting period of the first PDCCH search space; and/or reset, in response to transmitting the PDCCH in the first PDCCH search space, the counter; and/or reset, in response to completing the switching of the PDCCH search space, the counter.

In some embodiments of the present disclosure, the first BWP belongs to a first serving cell. The processing unit 510 is specifically configured to switch a PDCCH search space of the first serving cell based on a switching result of a PDCCH search space of a second serving cell.

In some embodiments of the present disclosure, the processing unit 510 is specifically configured to switch the PDCCH search space for transmitting the PDCCH based on the switching result and a position of a first PDCCH search space that is activated and corresponds to the first BWP in a PDCCH search space queue. The PDCCH search space queue is formed by sorting all PDCCH search spaces corresponding to the first BWP in an ascending order based on the PDCCH transmitting periods.

In some embodiments of the present disclosure, the processing unit 510 is specifically configured to: switch a PDCCH search space for transmitting the PDCCH corresponding to the first BWP to a PDCCH search space following the first PDCCH search space in the PDCCH search space queue, when the PDCCH search space of the second serving cell is switched to a PDCCH search space with a longer PDCCH transmitting period, and the first PDCCH search space is not the last PDCCH search space in the PDCCH search space queue; and/or switch a PDCCH search space for transmitting the PDCCH corresponding to the first BWP to a PDCCH search space immediately preceding the first PDCCH search space in the PDCCH search space queue, when the PDCCH search space of the second serving cell is switched to a PDCCH search space with a shorter PDCCH transmitting period, and the first PDCCH search space is not the first PDCCH search space in the PDCCH search space queue.

In some embodiments of the present disclosure, the processing unit 510 is specifically configured to switch, after an expiry of a second timer, the PDCCH search space of the first serving cell based on the switching result of the PDCCH search space of the second serving cell. A time length of the second timer is a maximum time length during which the terminal device is allowed to receive no PDCCH in the first PDCCH search space that is activated and corresponds to the first BWP.

In some embodiments of the present disclosure, the processing unit 510 is further configured to: start or restart, in response to transmitting the PDCCH in the first PDCCH search space, the second timer; and/or start or restart, in response to completing the switching of the PDCCH search space, the second timer.

In some embodiments of the present disclosure, the processing unit 510 is specifically configured to switch, after an expiry of a third timer, the PDCCH search space of the first serving cell based on the switching result of the PDCCH search space of the second serving cell. A time length of the third timer is a minimum time interval during which the network device is allowed to switch the PDCCH search space.

In some embodiments of the present disclosure, the processing unit 510 is further configured to: start or restart, in response to transmitting the PDCCH in the first PDCCH search space that is activated and corresponds to the first BWP, the third timer; and/or start or restart, in response to completing the switching of the PDCCH search space, the third timer.

In some embodiments of the present disclosure, the network device further includes a transmitting unit configured to transmit configuration information. The configuration information includes at least one of: at least one serving cell; at least one BWP corresponding to each serving cell; at least one PDCCH search space corresponding to each BWP; a PDCCH transmitting period corresponding to each PDCCH search space; DRX; and a WUS.

It should be understood that the device embodiments may correspond to the method embodiments, and thus similar description of the device embodiments may refer to the method embodiments. Specifically, the network device 500 illustrated in FIG. 8 may correspond to a corresponding subject in the method 300 that executes the embodiments of the present disclosure. In addition, the above and other operations and/or functions of the various units in the network device 500 are respectively intended to implement corresponding processes in the various methods in FIG. 1. For brevity, details thereof will be omitted here.

The communication device of the embodiments of the present disclosure is described above from the perspective of a functional module in combination with FIG. 7 and FIG. 8. It should be understood that the functional module can be implemented in a form of hardware, or software instructions, or can be implemented in a combination of hardware and software modules. For example, the above processing unit may be realized by a processor, and the above receiving unit and transmitting unit may be realized by a transceiver.

Specifically, the steps of the method embodiments in the embodiments of the present disclosure may be completed by integrated logic circuits of hardware in the processor and/or instructions in a form of software. The steps of the methods disclosed in the embodiments of the present disclosure may be directly embodied as being executed and completed by a hardware decoding processor, or executed and completed by a combination of hardware in a decoding processor and software modules.

Optionally, the software module may be located in a known storage medium in the related art, such as a random access memory, a flash memory, a read-only memory, a programmable read-only memory, an electrically erasable programmable memory, and a register. The storage medium can be located in a memory, and the processor can read information from the memory, and perform the steps in the above method embodiments in combination with its hardware.

FIG. 9 is a schematic diagram showing a structure of a communication device 600 according to an embodiment of the present disclosure. The communication device 600 illustrated in FIG. 9 includes a processor 610. The processor 610 is configured to invoke and run a computer program from a memory to perform the method according to any of the embodiments of the present disclosure.

Optionally, as illustrated in FIG. 9, the communication device 600 may further include a memory 620. The memory 620 may be configured to store indication information, and may also be configured to store codes, instructions, and the like executed by the processor 610. Here, the processor 610 may invoke and run a computer program from the memory 620 to perform the method according to any of the embodiments of the present disclosure.

Here, the memory 620 may be a separate component independent of the processor 610, or may be integrated in the processor 610.

Optionally, as illustrated in FIG. 9, the communication device 600 may further include a transceiver 630. The processor 610 may control the transceiver 630 to communicate with other devices, specifically, to transmit information or data to other devices, or receive information or data transmitted by other devices.

Here, the transceiver 630 may include a transmitter and a receiver. The transceiver 630 may further include one or more antennas.

Optionally, the communication device 600 may be a terminal device according to an embodiment of the present disclosure. The communication device 600 may implement corresponding processes implemented by the terminal device in the method according to any of the embodiments of the present disclosure. That is, the communication device 600 according to an embodiment of the present disclosure may correspond to the terminal device 400 according to an embodiment of the present disclosure, and may correspond to a corresponding subject in the method 200 that executes the embodiments of the present disclosure. For brevity, details thereof will be omitted herein.

Optionally, the communication device 600 may be the network device according to any of the embodiments of the present disclosure. The communication device 600 may implement corresponding processes implemented by the network device in the method according to any of the embodiments of the present disclosure. That is, the communication device 600 according to an embodiment of the present disclosure may correspond to the network device 500 according to an embodiment of the present disclosure, and may correspond to a corresponding subject in the method 300 that executes the embodiments of the present disclosure. For brevity, details thereof will be omitted herein.

It should be understood that various components in the communication device 600 may be connected by a bus system. In addition to a data bus, the bus system may further include a power bus, a control bus, and a status signal bus.

In addition, an embodiment of the present disclosure further provides a chip. The chip may be an integrated circuit chip with a signal processing capability, and can implement or execute the methods, steps, and logical block diagrams disclosed in the embodiments of the present disclosure.

Optionally, the chip can be applied to various communication devices, such that a communication device provided with the chip can execute the methods, steps, and logical block diagrams disclosed in the embodiments of the present disclosure.

FIG. 10 is a schematic diagram showing a structure of a chip according to an embodiment of the present disclosure.

A chip 700 illustrated in FIG. 10 includes a processor 710. The processor 710 can invoke and run a computer program from a memory to perform the method according to any of the embodiments of the present disclosure.

Optionally, as illustrated in FIG. 10, the chip 700 may further include a memory 720. The processor 710 may invoke and run a computer program from the memory 720 to perform the method according to any of the embodiments of the present disclosure. The memory 720 may be configured to store indication information, and may further be configured to store codes, instructions, and the like executed by the processor 710.

Here, the memory 720 may be a separate component independent of the processor 710, or may be integrated in the processor 710.

Optionally, the chip 700 may further include an input interface 730. The processor 710 can control the input interface 730 to communicate with other devices or chips, specifically, to obtain information or data transmitted by other devices or chips.

Optionally, the chip 700 may further include an output interface 740. The processor 710 can control the output interface 740 to communicate with other devices or chips, specifically, to output information or data to other devices or chips.

Optionally, the chip can be applied to the network device according to any of the embodiments of the present disclosure. In addition, the chip can implement corresponding processes implemented by the network device in the method according to any of the embodiments of the present disclosure. For brevity, details thereof will be omitted herein.

Optionally, the chip can be applied to the terminal device according to any of the embodiments of the present disclosure. The chip can implement corresponding processes implemented by the terminal device in the method according to any of the embodiments of the present disclosure. For brevity, details thereof will be omitted herein.

It should be understood that the chip mentioned in the embodiments of the present disclosure may also be referred to as a system-level chip, a system-chip, a chip system, or a system-on-chip. It should also be understood that various components in the chip 700 may be connected by a bus system. Here, in addition to a data bus, the bus system may further include a power bus, a control bus, and a status signal bus.

The processor may include, but not limited to a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component.

The processor may be configured to implement or perform the methods, steps, and logical block diagrams disclosed in the embodiments of the present disclosure. The steps of the methods disclosed in the embodiments of the present disclosure may be directly embodied as being performed and completed by a hardware decoding processor, or by a combination of hardware in the decoding processor and software modules. The software modules can be located in a known storage medium in the related art, such as a random access memory, a flash memory, a read-only memory, programmable read-only memory, an electrically erasable programmable memory, or a register. The storage medium can be located in the memory, and the processor can read information from the memory and perform the steps of the above methods in combination with its hardware.

The memory may include, but not limited to, a transitory memory and/or a non-transitory memory. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative, rather than limiting, many forms of RAMS are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM).

It is to be noted that the memory used for the system and method described in the present disclosure is intended to include, but not limited to, these and any other suitable types of memories.

An embodiment of the present disclosure also provides a computer-readable storage medium for storing a computer program. The computer-readable storage medium may store one or more programs. The one or more programs may include instructions. When the instructions are executed by a portable electronic device including a plurality of applications, the portable electronic device can execute the method in the illustrated embodiments of the method.

Optionally, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including a computer program.

Optionally, the computer program product can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program. The computer program, when executed by a computer, can cause the computer to perform the method in the illustrated embodiments of the method.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

An embodiment of the present disclosure also provides a communication system. The communication system can include the terminal device and the network device as described above. Details thereof will be omitted here for simplicity.

It should be noted that terms "system" herein can also be referred to as "a network management architecture", "a network system", or the like.

It should also be appreciated that terms used in the embodiments of the present disclosure and the claims as attached are only for the purpose of describing specific embodiments, and are not intended to limit the embodiments of the present disclosure.

For example, singular forms of "a", "said", "above" and "the" used in the embodiments of the present disclosure and the claims as attached are also intended to include plural forms, unless the context clearly indicates other meanings.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

When the function is implemented in the form of a software functional unit and sold or used as a standalone product, it can be stored in a computer-readable storage medium. Based on this understanding, all or part of the technical solutions according to any of the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, a Read-Only Memory (ROM), a Random Access Memory (RAM), a magnetic disk, or an optical disc.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways.

For example, the divisions of the units or modules or components in the device embodiments described above are only divisions based on logical functions, and there may be other divisions in actual implementations. For example, more than one unit or module or component may be combined or integrated into another system, or some units or modules or components can be ignored or omitted.

For another example, the units/modules/components described as separate/display components may or may not be physically separated, that is, they may be co-located or distributed across a number of network elements. Some or all of the units/modules/components may be selected according to actual needs to achieve the objects of the embodiments of the present disclosure.

In addition, it needs to be noted that the mutual coupling or direct coupling or communicative connection as shown or discussed may be indirect coupling or communicative connection between devices or units via some interfaces which may be electrical, mechanical, or in any other forms.

While the specific embodiments of the present disclosure have been described above, the protect scope of the embodiments of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A method for adjusting a Physical Downlink Control Channel (PDCCH) monitoring period, comprising:
switching, by a terminal device within a plurality of PDCCH search spaces corresponding to a first Bandwidth Part (BWP), a PDCCH search space for monitoring a PDCCH, wherein different PDCCH search spaces correspond to different PDCCH monitoring periods,
wherein the method further comprises:
switching, by the terminal device, a BWP for receiving data from the first BWP to a second BWP;
determining, by the terminal device, an initially activated PDCCH search space in at least one PDCCH search space corresponding to the second BWP; and
monitoring, by the terminal device, the PDCCH in the initially activated PDCCH search space.

2. The method according to claim 1, wherein said switching the PDCCH search space for monitoring the PDCCH comprises:
switching, by the terminal device based on a position of a first PDCCH search space that is activated and corresponds to the first BWP in a PDCCH search space queue, the PDCCH search space for monitoring the PDCCH, wherein the PDCCH search space queue is formed by sorting all PDCCH search spaces corresponding to the first BWP in an ascending order based on PDCCH monitoring periods.

3. The method according to claim 2, wherein said switching, by the terminal device based on the position of the first PDCCH search space that is activated and corresponds to the first BWP in the PDCCH search space queue, the PDCCH search space for monitoring the PDCCH comprises:
switching, by the terminal device, to a PDCCH search space following the first PDCCH search space in the PDCCH search space queue, when the first PDCCH search space is not a last PDCCH search space in the PDCCH search space queue.

4. The method according to claim 3, further comprising:
maintaining, by the terminal device, the first PDCCH search space as an activated PDCCH search space, when the first PDCCH search space is the last PDCCH search space in the PDCCH search space queue.

5. The method according to claim 1, wherein the first BWP belongs to a first serving cell; and
said switching the PDCCH search space for monitoring the PDCCH comprises:
switching, by the terminal device, a PDCCH search space of the first serving cell based on a switching result of a PDCCH search space of a second serving cell.

6. A method for adjusting a Physical Downlink Control Channel (PDCCH) monitoring period, comprising:
switching, by a network device within a plurality of PDCCH search spaces corresponding to a first Bandwidth Part (BWP), a PDCCH search space for transmitting a PDCCH, wherein different PDCCH search spaces correspond to different PDCCH monitoring periods,
wherein the method further comprises:
switching, by the network device, a BWP for transmitting data from the first BWP to a second BWP;
determining, by the network device, an initially activated PDCCH search space in at least one PDCCH search space corresponding to the second BWP; and
transmitting, by the network device, the PDCCH in the initially activated PDCCH search space.

7. The method according to claim 6, wherein said switching the PDCCH search space for transmitting the PDCCH comprises:
switching, by the network device based on a position of a first PDCCH search space that is activated and corresponds to the first BWP in a PDCCH search space queue, the PDCCH search space for transmitting the PDCCH, wherein the PDCCH search space queue is formed by sorting all PDCCH search spaces corresponding to the first BWP in an ascending order based on PDCCH transmitting periods.

8. The method according to claim 7, wherein said switching, by the network device based on the position of the first PDCCH search space that is activated and corresponds to the first BWP in the PDCCH search space queue, the PDCCH search space for transmitting the PDCCH comprises:
switching, by the network device, to a PDCCH search space following the first PDCCH search space in the PDCCH search space queue, when the first PDCCH search space is not a last PDCCH search space in the PDCCH search space queue.

9. The method according to claim 6, wherein the first BWP belongs to a first serving cell; and
said switching the PDCCH search space for transmitting the PDCCH comprises:
switching, by the network device, a PDCCH search space of the first serving cell based on a switching result of a PDCCH search space of a second serving cell.

10. A terminal device, comprising:
a processor configured to invoke and run a computer program stored in a memory to:
switch, within a plurality of Physical Downlink Control Channel (PDCCH) search spaces corresponding to a first Bandwidth Part (BWP), a PDCCH search space for monitoring a PDCCH, wherein different PDCCH search spaces correspond to different PDCCH monitoring periods,
wherein the processor is further configured to invoke and run the computer program stored in the memory to:
switch a BWP for receiving data from the first BWP to a second BWP; and
determine an initially activated PDCCH search space in at least one PDCCH search space corresponding to the second BWP;
wherein the processor is further configured to invoke and run the computer program stored in the memory to monitor the PDCCH in the initially activated PDCCH search space.

11. The terminal device according to claim 10, wherein the processor is further configured to invoke and run the computer program stored in the memory to:
switch, based on a position of a first PDCCH search space that is activated and corresponds to the first BWP in a PDCCH search space queue, the PDCCH search space for monitoring the PDCCH, wherein the PDCCH search space queue is formed by sorting all PDCCH search spaces corresponding to the first BWP in an ascending order based on PDCCH monitoring periods.

12. The terminal device according to claim 11, wherein the processor is further configured to invoke and run the computer program stored in the memory to:
  switch to a PDCCH search space following the first PDCCH search space in the PDCCH search space queue, when the first PDCCH search space is not a last PDCCH search space in the PDCCH search space queue.

13. The terminal device according to claim 10, wherein the first BWP belongs to a first serving cell; and
  wherein the processor is further configured to invoke and run the computer program stored in the memory to:
  switch a PDCCH search space of the first serving cell based on a switching result of a PDCCH search space of a second serving cell.

14. A network device, comprising:
  a processor configured to invoke and run a computer program stored in a memory to:
  switch, within a plurality of PDCCH search spaces corresponding to a first Bandwidth Part (BWP), a PDCCH search space for transmitting a PDCCH, wherein different PDCCH search spaces correspond to different PDCCH monitoring periods,
  wherein the processor is further configured to invoke and run the computer program stored in the memory to:
  switch a BWP for transmitting data from the first BWP to a second BWP;
  determine an initially activated PDCCH search space in at least one PDCCH search space corresponding to the second BWP; and
  transmit the PDCCH in the initially activated PDCCH search space.

15. The network device according to claim 14, wherein the processor is further configured to invoke and run the computer program stored in the memory to:
  switch, based on a position of a first PDCCH search space that is activated and corresponds to the first BWP in a PDCCH search space queue, the PDCCH search space for transmitting the PDCCH, wherein the PDCCH search space queue is formed by sorting all PDCCH search spaces corresponding to the first BWP in an ascending order based on PDCCH transmitting periods.

16. The network device according to claim 15, wherein the processor is further configured to invoke and run the computer program stored in the memory to:
  switch to a PDCCH search space following the first PDCCH search space in the PDCCH search space queue, when the first PDCCH search space is not a last PDCCH search space in the PDCCH search space queue.

17. The network device according to claim 14, wherein the first BWP belongs to a first serving cell; and
  the processor is further configured to invoke and run the computer program stored in the memory to switch a PDCCH search space of the first serving cell based on a switching result of a PDCCH search space of a second serving cell.

* * * * *